United States Patent
Fujita et al.

(10) Patent No.: US 10,224,006 B2
(45) Date of Patent: Mar. 5, 2019

(54) DISPLAY DEVICE FOR VEHICLE

(71) Applicant: DENSO CORPORATION, Kariya, Aichi-pref. (JP)

(72) Inventors: Katsumi Fujita, Kariya (JP); Satoru Tamura, Kariya (JP); Masashi Toyota, Kariya (JP); Seigo Tane, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/736,185

(22) PCT Filed: Apr. 15, 2016

(86) PCT No.: PCT/JP2016/002042
§ 371 (c)(1),
(2) Date: Dec. 13, 2017

(87) PCT Pub. No.: WO2017/006503
PCT Pub. Date: Jan. 12, 2017

(65) Prior Publication Data
US 2018/0190242 A1   Jul. 5, 2018

(30) Foreign Application Priority Data
Jul. 9, 2015   (JP) .................................. 2015-138055

(51) Int. Cl.
*G06F 3/14*   (2006.01)
*G09G 5/10*   (2006.01)
(Continued)

(52) U.S. Cl.
CPC .............. *G09G 5/12* (2013.01); *B60K 35/00* (2013.01); *B60K 37/02* (2013.01); *G02B 27/01* (2013.01);
(Continued)

(58) Field of Classification Search
None
See application file for complete search history.

(56) References Cited

U.S. PATENT DOCUMENTS

2013/0176335 A1*   7/2013   Sugiyama .............. B60K 35/00
                                                           345/633
2015/0010207 A1   1/2015   Inada et al.
(Continued)

FOREIGN PATENT DOCUMENTS

JP   2013218671 A   10/2013
JP   2015-018093 A   1/2015
(Continued)

OTHER PUBLICATIONS

Paradiso ("LED Strip trail effect", 2013, https://www.youtube.com/watch?v=R9wbYRV1AEM).*

*Primary Examiner* — Xin Sheng
(74) *Attorney, Agent, or Firm* — Harness, Dickey & Pierce, P.L.C.

(57) ABSTRACT

A display device for a vehicle includes: a first display unit that displays a real image of first information in a first display portion; and a second display unit that displays a virtual image of second information in a second display portion by projecting an optical image to the second display portion, the second display portion being disposed above the first display portion and transmitting an external image. The display device includes: a light emission unit located adjacent to a side of the first display portion to form a light emission area; and a control unit that changes the light emission area in a guiding direction from the first display portion toward the second display portion during a linking period for linking a particular virtual image display of the second information with a real image display of the first information.

14 Claims, 20 Drawing Sheets

(51) Int. Cl.
  *G09G 5/12* (2006.01)
  *G09G 5/14* (2006.01)
  *H04N 5/74* (2006.01)
  *B60K 35/00* (2006.01)
  *B60K 37/02* (2006.01)
  *G02B 27/01* (2006.01)
  *G06T 11/60* (2006.01)

(52) U.S. Cl.
  CPC ....... *G02B 27/0101* (2013.01); *G06F 3/1423* (2013.01); *G06T 11/60* (2013.01); *G09G 5/10* (2013.01); *G09G 5/14* (2013.01); *H04N 5/74* (2013.01); *B60K 2350/1072* (2013.01); *B60K 2350/203* (2013.01); *B60K 2350/2052* (2013.01); *B60K 2350/2065* (2013.01); *G09G 2380/10* (2013.01)

(56) References Cited

U.S. PATENT DOCUMENTS

2015/0015962 A1    1/2015  Takasu et al.
2015/0015963 A1*   1/2015  Takasu .................. G02B 27/01
                                                     359/630

FOREIGN PATENT DOCUMENTS

| JP | 2015027868 A | 2/2015 |
| JP | 2015168264 A | 9/2015 |
| JP | 2016057277 A | 4/2016 |
| WO | WO-2015001765 A1 | 1/2015 |

* cited by examiner

DISPLAY DEVICE FOR VEHICLE

CROSS REFERENCE TO RELATED APPLICATION-APPLICATIONS

This application is a U.S. National Phase Application under 35 U.S.C. 371 of International Application No. PCT/JP2016/002042 filed on Apr. 15, 2016 and published in Japanese as WO 2017/006503 A1 on Jan. 12, 2017. This application is based on and claims the benefit of priority from Japanese Patent Application No. 2015-138055 filed on Jul. 9, 2015. The entire disclosures of all of the above applications are incorporated herein by reference.

TECHNICAL FIELD

The present disclosure relates to a display device for a vehicle to display vehicle information related to the vehicle.

BACKGROUND ART

A vehicle display device is widely known, which displays vehicle information on each of a first display portion and a second display portion.

More specifically, a vehicle display device disclosed in Patent Literature 1 includes a display screen area that corresponds to a second display portion capable of transmitting an external image. The display screen area is generally located above a meter unit that displays a real image of vehicle information. An optical image is projected to the display screen area to display a virtual image of the vehicle information.

PRIOR ART LITERATURES

Patent Literature

Patent Literature 1: JP 2013-218671 A

SUMMARY OF INVENTION

According to the vehicle display device disclosed in Patent Literature 1, the virtual image of the vehicle information displayed on the display screen area switches in accordance with a gaze area at which a user inside a vehicle gazes. For example, when the gaze area includes the meter unit, a virtual image of vehicle information identical to the meter unit is displayed on the display screen area.

However, vehicle information necessary for a user does not necessarily match with vehicle information at which the user gazes. For example, when a particular virtual image display in the display screen area is configured to link with a real image display of the meter unit in response to a switch operation or the like capable of transmitting a more accurate intention of the user than gazing by the user, a mismatch may be produced between necessary information and gaze information. When a mismatch between necessary information and gaze information is present, the degree of effectiveness of the vehicle information may lower.

When a virtual image in the display screen area is displayed in linkage with a real image display of the meter unit, the user does not easily notice the virtual image at the time of linkage. In this case, the user does not pay attention to necessary information. Accordingly, the degree of secure notification of vehicle information achievable through the linkage may lower.

It is an object of the present disclosure to provide a display device for a vehicle to enhance effectiveness and secure notification of vehicle information.

According to an aspect of the present disclosure, a display device for displaying vehicle information associated with a vehicle includes:

a first display unit that displays a real image of first information in a first display portion inside the vehicle, the first information indicating the vehicle information;

a second display unit that displays a virtual image of second information in a second display portion inside the vehicle by projecting an optical image to the second display portion, the second display portion being disposed above the first display portion and transmitting an external image, and the second information indicating the vehicle information;

a light emission unit that forms a light emission area in a light emission portion inside the vehicle and adjacent to a side of the first display portion; and a control unit that controls the first display unit and the second display unit, and controls the light emission unit, the control unit changing the light emission area in a guiding direction from the first display portion toward the second display portion during a linking period for linking a particular virtual image display of the second information with a real image display of the first information.

During the linking period, a particular virtual image of the second information displayed in the second display portion above the first display portion is linked with a real image of the first information displayed in the first display portion. At this time, the light emission area of the light emission portion disposed on the side of the first display portion changes in the guiding direction from the first display portion to the second display portion. In this case, a user inside the vehicle directs a gaze to the particular second information requiring notification in association with the first information, because the eyes of the user are guided toward the second information. The linkage of display realizes matching between necessary information and gaze information, and improves effectiveness and secure notification of vehicle information.

DESCRIPTION OF EMBODIMENTS

Figure 1:
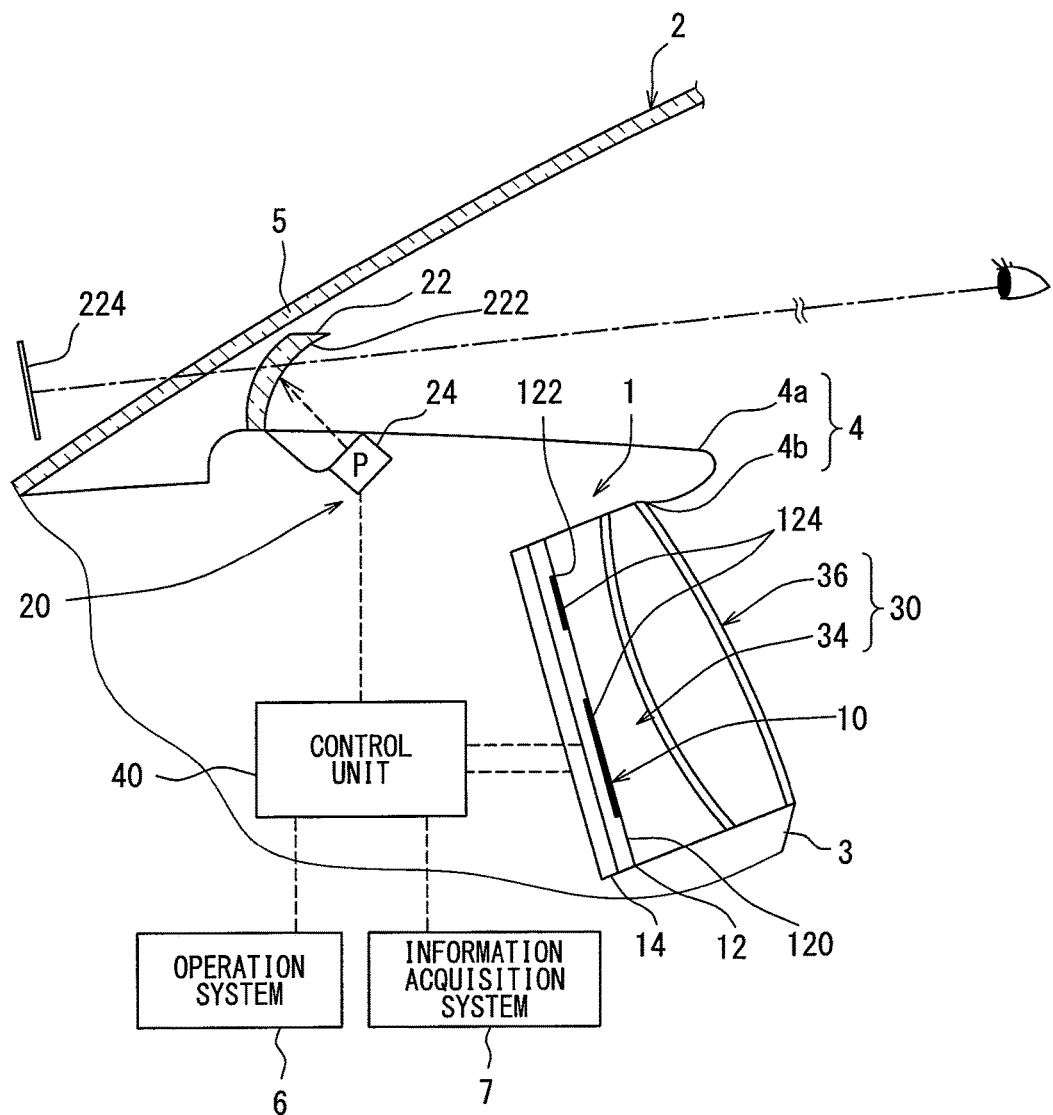
FIG. 1 is a schematic view illustrating a configuration of a display device for a vehicle according to a first embodiment mounted on a vehicle.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As illustrated in FIG. 1, a display device 1 for a vehicle is provided in front of a driver seat inside a vehicle 2. The display device 1 displays vehicle information associated with the vehicle 2 in such a manner that the vehicle information is visible to a user on the driver seat. The display device 1 includes a first display unit 10, a second display unit 20, a light emission unit 30, and a control unit 40. Note that an upper direction, a lower direction, and a lateral direction in the following description respectively indicate an upper direction, a lower direction, and a lateral direction inside the vehicle 2 with respect to a horizontal plane.

As illustrated in FIGS. 1 to 4, the first display unit 10 is housed in a hood 4 provided on an instrument panel 3, and located in front of the driver seat inside the vehicle 2. The first display unit 10 includes a display panel 12 configured by a liquid crystal panel or an organic EL panel, for example. The display panel 12 includes a first display portion 122 having a substantially rectangular shape, between left and right side portions 120a of a screen 120. The screen 120 displays a color display image in accordance with operations of a plurality of pixels. The display panel 12 displays a real image of predetermined first information 124, corresponding to vehicle information, in the first display portion 122. In this case, the hood 4 includes a display opening 4b which has a substantially rectangular shape and through which the whole of the first display portion 122 is exposed to the driver seat. The real image of the first information 124 is visible to the user on the driver seat through the display opening 4b. In addition, a backlight 14 is included in the first display unit 10 to illuminate the screen 120 by transillumination. The real image of the first information 124 receives light from the backlight 14 to become visible to the user in a light emission state.

Figure 2:
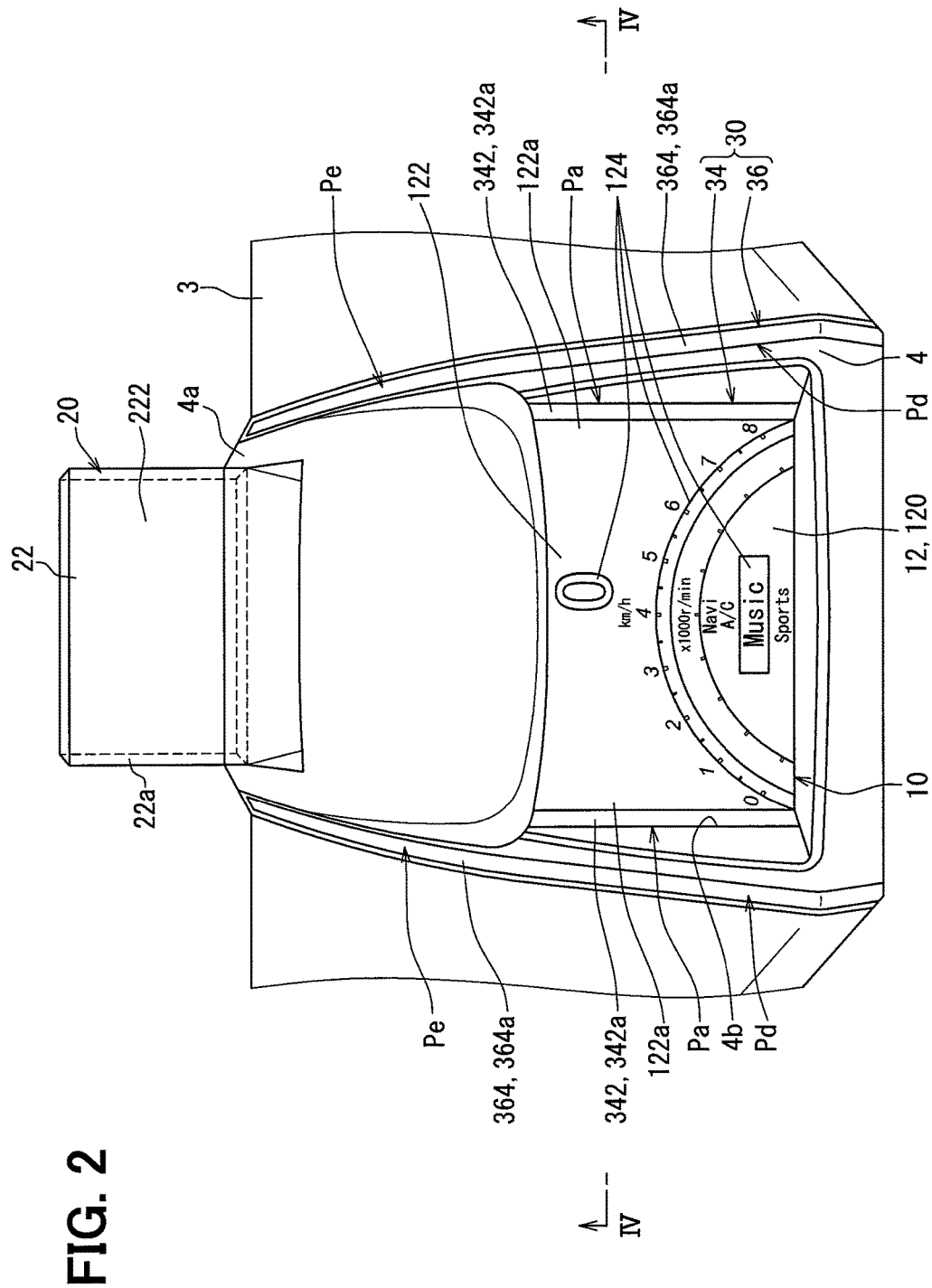
FIG. 2 is a front view illustrating the display device for a vehicle according to the first embodiment.
Figure 3:
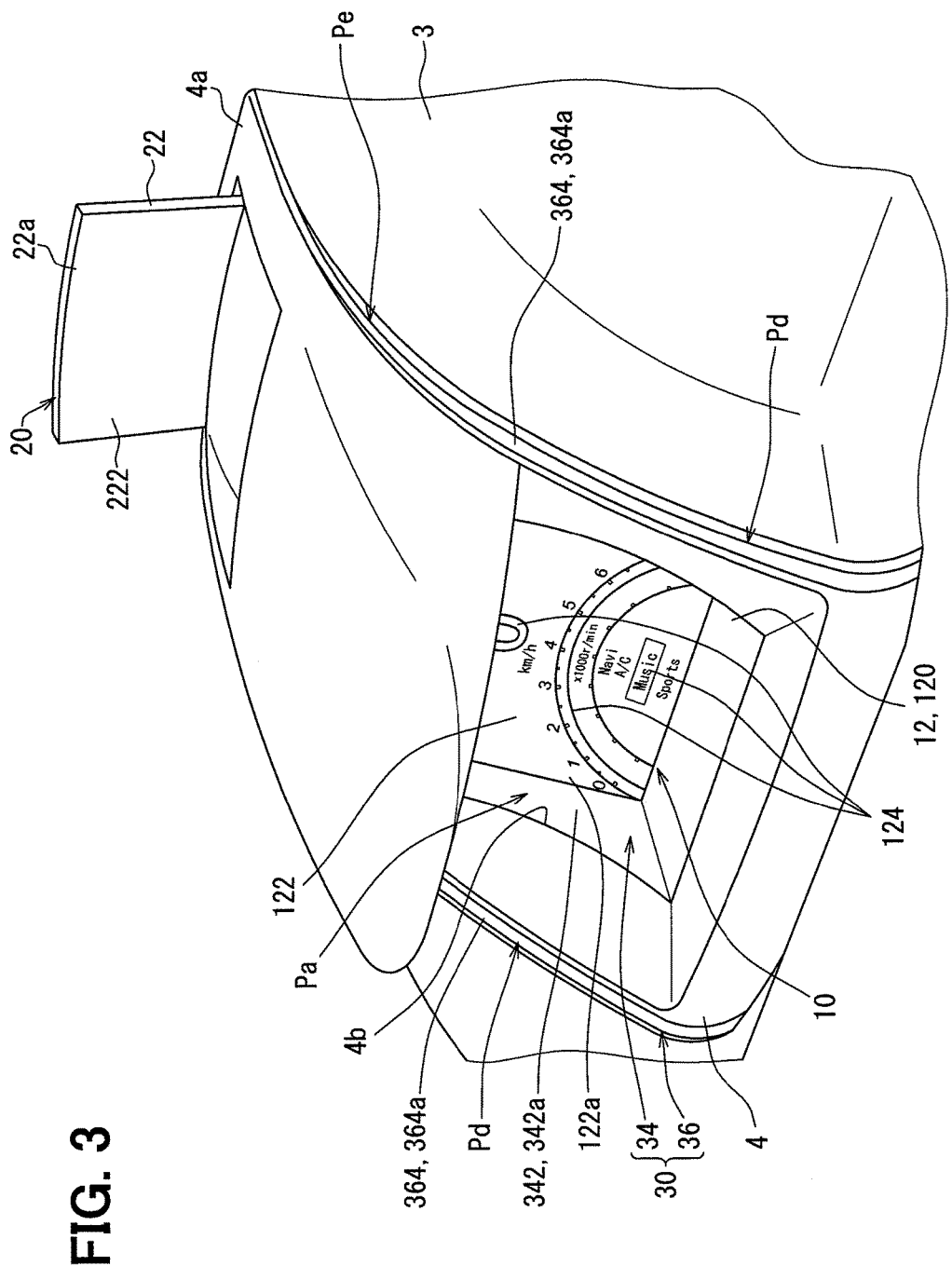
FIG. 3 is a perspective view illustrating the display device for a vehicle according to the first embodiment.

As illustrated in FIGS. 1 to 3, the second display unit 20 is configured by a head-up display (HUD) including a combiner 22 and a projector 24. The combiner 22 is disposed on a visor portion 4a of the hood 4. The visor portion 4a is located above the first display portion 122, and extended toward a front wind shield 5 of the vehicle 2. The combiner 22 is formed of light transmitting resin such as acrylic resin, for example, and located closer to the driver seat inside the vehicle 2 than the front wind shield 5 is. The combiner 22 receives light of an external image having entered from the outside of the vehicle 2 and passed through the front wind shield 5, and further transmits the light toward the driver seat. Accordingly, the user is allowed to visually recognize a real image of the external image through the front wind shield 5 and the combiner 22. According to the present embodiment, the combiner 22 is stored inside the hood 4 or exposed above the visor portion 4a in accordance with an operation of a display switch described below, for example. However, the combiner 22 may be constantly exposed above the visor portion 4a.

As illustrated in FIG. 1, the projector 24 is located below the visor portion 4a inside the vehicle 2, and housed in the instrument panel 3. The projector 24 is of a liquid crystal type or a scanning type, for example, and forms an optical image indicating second information 224. The optical image formed by the projector 24 is projected to the combiner 22. As illustrated in FIGS. 2 and 3, a second display portion 222 is formed into a substantially rectangular shape throughout the combiner 22, or in a part of the combiner except for an outer circumference 22a. Light of the optical image projected from the projector 24 is reflected on the second display portion 222 toward the driver seat as indicated by a chain line in FIG. 1 to form a virtual image of the second information 224 presented toward the driver seat. According to the configuration, the virtual image of the second information 224 in the second display portion 222 disposed above the first display portion 122 inside the vehicle 2 is visible to the user on the driver seat, together with the real image of the external image transmitted from the outside of the vehicle 2. Note that the second display unit 20 may include an optical system, such as a reflection mirror, which reflects light of the optical image formed by the projector 24 to project the optical image to the combiner 22. In addition, the optical image may be projected to the second display portion 222 defined in the front wind shield 5 to realize the virtual image display of the second information 224 without using the combiner 22.

Figure 4:
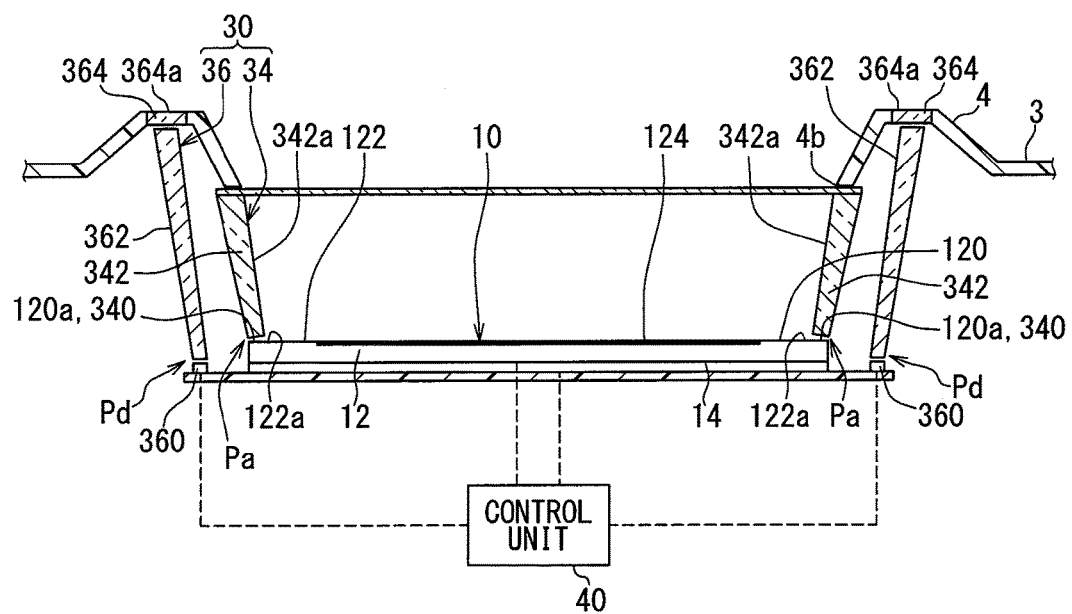
FIG. 4 is a cross-sectional view taken along a line IV-IV in FIG. 2.

As illustrated in FIGS. 1 to 4, the light emission unit 30 is housed in the hood 4 at the left and right sides thereof inside the vehicle 2, through the display units 10 and 20. The light emission unit 30 includes two types of light emission portions 34 and 36, as a light emission portion disposed inside the vehicle 2 and located adjacent to the external side of the first display portion 122. As illustrated in FIGS. 2 to 4, the adjacent light emission portion 34 is disposed at adjacent positions Pa located adjacent to left and right side edges 122a of the first display portion 122 and extending along the left and right side edges 122a. The adjacent light emission portion 34 is configured by a combination of an adjacent light source 340 and an adjacent light guide body 342.

As illustrated in FIG. 4, the adjacent light source 340 is disposed at each of adjacent positions Pa. Each of the adjacent light sources 340 is configured by a side portion 120a in a band-shaped range of the screen 120 of the display panel 12. The side portion 120a is disposed on the external side of the first display portion 122, and provided common to the units 10 and 30. Each of the adjacent light sources 340 controls operations of a plurality of pixels contained in the corresponding side portion 120a to control a light transmission area that transmits light coming from the backlight 14. Described hereinafter is control of the adjacent light sources 340 mainly by controlling the plurality of pixels and the backlight 14 at the corresponding side portions 120a of the display panel 12.

As illustrated in FIGS. 2 to 4, each of the adjacent light guide bodies 342 is provided at the corresponding adjacent position Pa. Each of the adjacent light guide bodies 342 is formed of transmitting resin, such as acrylic resin, and has a plate shape. The adjacent light guide bodies 342 are disposed on the driver seat side of the adjacent light sources 340 with one-to-one correspondence. Each of the adjacent light guide bodies 342 is inclined toward the external side as approaching to the driver seat from the light entrance end face facing the corresponding light source 340. Each of the adjacent light guide bodies 342 has a light emission face 342a that forms a slope shape and is visible to the user on the driver seat through the display opening 4b of the hood 4. Light enters the light entrance end face of each of the adjacent light guide bodies 342 from the light transmission area of the corresponding light source 340. As a result, at least a part of the light emission face 342a of each of the adjacent light guide bodies 342 in correspondence with the light emission area of the adjacent light source 340 emits light by the light received from the light transmission area of the light source 340. According to the above-described configuration, each of the adjacent light guide bodies 342 disposed at the adjacent positions Pa extending along the side edges 122a of the first display portion 122 forms an adjacent light emission area 346 (see FIGS. 5 and 6) in the corresponding light emission face 342a. The adjacent light emission area 346 emits light in correspondence with the light transmission area of the corresponding adjacent light source 340.

Each of the separate light emission portions 36 is disposed at a separate position Pd located on the external side away from the left or right side edge 122a of the first display portion 122 through the corresponding adjacent light emission portion 34. As illustrated in FIGS. 2 and 3, each of the separate light emission portions 36 according to the present embodiment is extended frontward and upward from the corresponding separate position Pd inside the vehicle 2. In the following description, a position of the separate light emission portion 36 extended frontward and upward from each of the separate positions Pd is referred to as an extension position Pe. Each of the separate light emission portions 36 is configured by a combination of a separate light source 360, a separate light guide body 362, and a separate light emission window 364.

As illustrated in FIG. 4, the separate light sources 360 are provided line by line in a range from the separate positions Pd located at the left and right external sides with respect to the adjacent light sources 340 to positions below the extension positions Pe (see FIGS. 2 and 3). A plurality of the separate light sources 360 provided for each line are configured by light emitting diodes (LEDs) capable of emitting light when turned on and energized. In the following description concerning the separate light sources 360, a position at which at least one of the separate light sources 360 is turned on is collectively referred to as a turned-on position of the light sources 360.

The separate light guide bodies 362 are provided one by one in a range extending from the separate positions Pd to positions below the extension positions Pe (see FIGS. 2 and 3). Each of the separate light guide bodies 362 is plate-shaped, and formed of light transmitting resin such as acrylic resin. The same number of the separate light guide bodies 362 as the number of the separate light sources 360 is provided on the driver seat side of the corresponding separate light sources 360. Each of the separate light guide bodies 362 is inclined toward the outside as approaching to the driver seat side from a light entrance end face facing the corresponding light source 360. The hood 4 is formed of light transmitting resin, such as polycarbonate resin, on which a light shield is printed. The separate light guide bodies 362 light-shielded by the hood 4 are substantially invisible from the user on the driver seat. Light coming from each of the corresponding light sources 360 that is tuned-on enters the light entrance end face of the separate light guide body 362. The separate light guide body 362 having received the light through the entrance end face at a portion corresponding to the turned-on position of the corresponding light source 360 guides the light toward an exit end face on the driver seat side.

As illustrated in FIGS. 2 to 4, the separate light emission windows 364 are provided one by one in a posture curved from the respective separate positions Pd and extending toward the respective extension positions Pe. Each of the separate light emission windows 364 is configured by a portion of the hood 4 at a light-shielding print cut position through which light transmitting resin is exposed. The separate light emission windows 364 are disposed on the driver seat side of the respective separate light guide bodies 362 with one-to-one correspondence. Each of the separate light emission windows 364 faces the exit end face of the corresponding light guide body 362. Each of the separate light emission windows 364 includes a light emission face 364a on the side opposite to the corresponding light guide body 362. Each of the light emission face 364a is visible to the user on the driver seat. Light coming from the corresponding light source 360 and guided by the corresponding light guide body 362 enters each of the separate light emission windows 364. As a result, at least a part of the light emission face 364a of each of the separate light emission windows 364 in correspondence with the turned-on position of the corresponding light source 360 receives light from the corresponding turned-on position and emits light. According to the configuration, a separate light emission area 366 is formed on the corresponding light emission face 364a by each of the separate light emission windows 364 provided at the separate position Pd separated from the side edge 122a of the first display portion 122 through the adjacent light emission portion 34, and at the extension position Pe extended from the separate position Pd. Each of the separate light emission areas 366 emits light in correspondence with the turned-on position of the separate light source 360 (see FIG. 6).

The control unit 40 illustrated in FIG. 1 is a display electronic control unit (ECU) mainly configured by a microcomputer, and housed in the instrument panel 3 inside the vehicle 2. The control unit 40 is communicatively connected to an operation system 6 and an information acquisition system 7 of the vehicle 2 via an in-vehicle LAN.

More specifically, the operation system 6 outputs an operation signal in response to reception of a predetermined operation from the user. The operation system 6 includes a power switch, a display switch, and a traveling mode switch, for example. The power switch receives an operation from the user to turn on or off a driving source, such as an internal combustion engine and a motor generator inside the vehicle 2. The display switch receives an operation from the user to switch a display status of the information 124 or 224 in the corresponding display portion 122 or 222. The traveling mode switch receives an operation from the user to select a traveling mode of the vehicle 2. The traveling mode of the vehicle 2 includes a normal mode, and an eco-mode giving higher priority to fuel efficiency in view of economy and ecology than the normal mode.

The information acquisition system 7 detects or acquires predetermined information to output an information signal. The information acquisition system 7 includes a vehicle speed sensor, an engine speed sensor, an external sensor, a navigation unit, and an integration ECU, for example. The vehicle speed sensor detects a traveling speed of the vehicle 2. The engine speed sensor detects the number of revolutions of the driving source of the vehicle 2 per unit time. The external sensor detects an obstacle present outside the vehicle 2 by using a camera, a radar, or the like. The navigation unit acquires traffic information concerning traveling of the vehicle 2, such as a speed limit. The integration ECU acquires fuel information concerning the driving source of the vehicle 2, and check information concerning system checking of the vehicle 2.

The control unit 40 receiving an operation signal or an information signal from the operation system 6 or the information acquisition system 7 is electrically connected to the other elements 10, 20, and 30 of the display device for a vehicle 1 as illustrated in FIGS. 1 and 4. More specifically, the control unit 40 is electrically connected to the display panel 12 and the backlight 14 of the first display unit 10, the projector 24 of the second display unit 20, and the separate light sources 360 of the light emission units 30. Accordingly, the control unit 40 controls the first display unit 10 and the second display unit 20, and also the light emission units 30 based on the operation signal or the information signal received from the operation system 6 or the information acquisition system 7.

(Operation Modes of Light Emission Unit)

Described hereinafter in detail are operation modes of the light emission units 30 realized under control by the control unit 40. The operation modes of the light emission unit 30 prepared herein includes a maintaining operation mode Mh illustrated in FIG. 5, and a guiding operation mode Md illustrated in FIG. 6.

Figure 5:
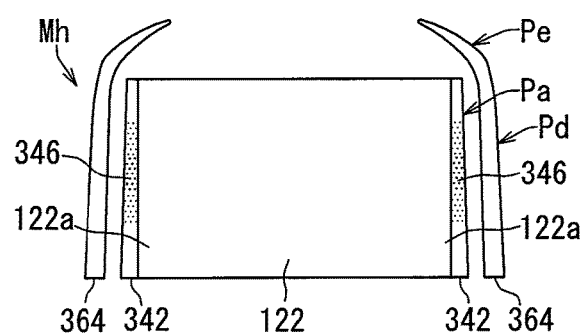
FIG. 5 is a schematic view illustrating a maintaining operation mode of a light emission unit included in the display device for a vehicle according to the first embodiment.

In the maintaining operation mode Mh, the control unit 40 fixes the light transmission areas by controlling the adjacent light sources 340. Accordingly, the adjacent light emission areas 346 of the adjacent light guide bodies 342 are maintained in a light emission state in an intermediate region of the adjacent positions Pa in the up-down direction as illustrated in FIG. 5. However, the light emission state of the adjacent light emission areas 346 of the adjacent light guide bodies 342 may be maintained throughout the adjacent positions Pa. In addition, the control unit 40 in the maintaining operation mode Mh brings the separate light sources 360 into a non-emission state. Accordingly, the separate light emission areas 366 in the non-emission state in the respective separate light emission windows 364 are maintained throughout the separate positions Pd and the extension positions Pe as illustrated in FIG. 5. In each of FIG. 5 and FIGS. 9, 12, 15, and 18 referred to below, light emitting portions corresponding to the light emission areas 346 and 366 are indicated as dot-hatched portions.

On the other hand, the control unit 40 in the guiding operation mode Md changes the light transmission areas by controlling the adjacent light sources 340. Accordingly, as illustrated in divisional figures (a), (b), and (c) of FIG. 6 in this order, the adjacent light emission areas 346 of the respective adjacent light guide bodies 342 sequentially shift in a guiding direction Dd from the first display portion 122 to the second display portion 222. In this case, particularly the adjacent light emission areas 346 of the adjacent light guide bodies 342 shift from lower ends of the adjacent positions Pa as illustrated in (a) of FIG. 6 toward upper ends as illustrated in (c) of FIG. 6. In addition, the control unit 40 in the guiding operation mode Md changes turned-on positions by controlling the separate light sources 360. As a result, the separate light emission areas 366 of the respective separate light emission windows 364 sequentially shift in the guiding direction Dd from the first display portion 122 to the second display portion 222 as illustrated in the divisional figures of (a), (b), (c), and (d) of FIG. 6 in this order. In this case, particularly the separate light emission areas 366 of the separate light emission windows 364 shift from lower ends of the separate positions Pd as illustrated in (a) of FIG. 6 toward front ends of the extension positions Pe as illustrated in (d) of FIG. 6. In each of FIG. 6 and FIGS. 10, 13, 16, and 19 referred to below, light emitting portions corresponding to the light emission areas 346 and 366 are indicated as dot-hatched portions.

Figure 6:
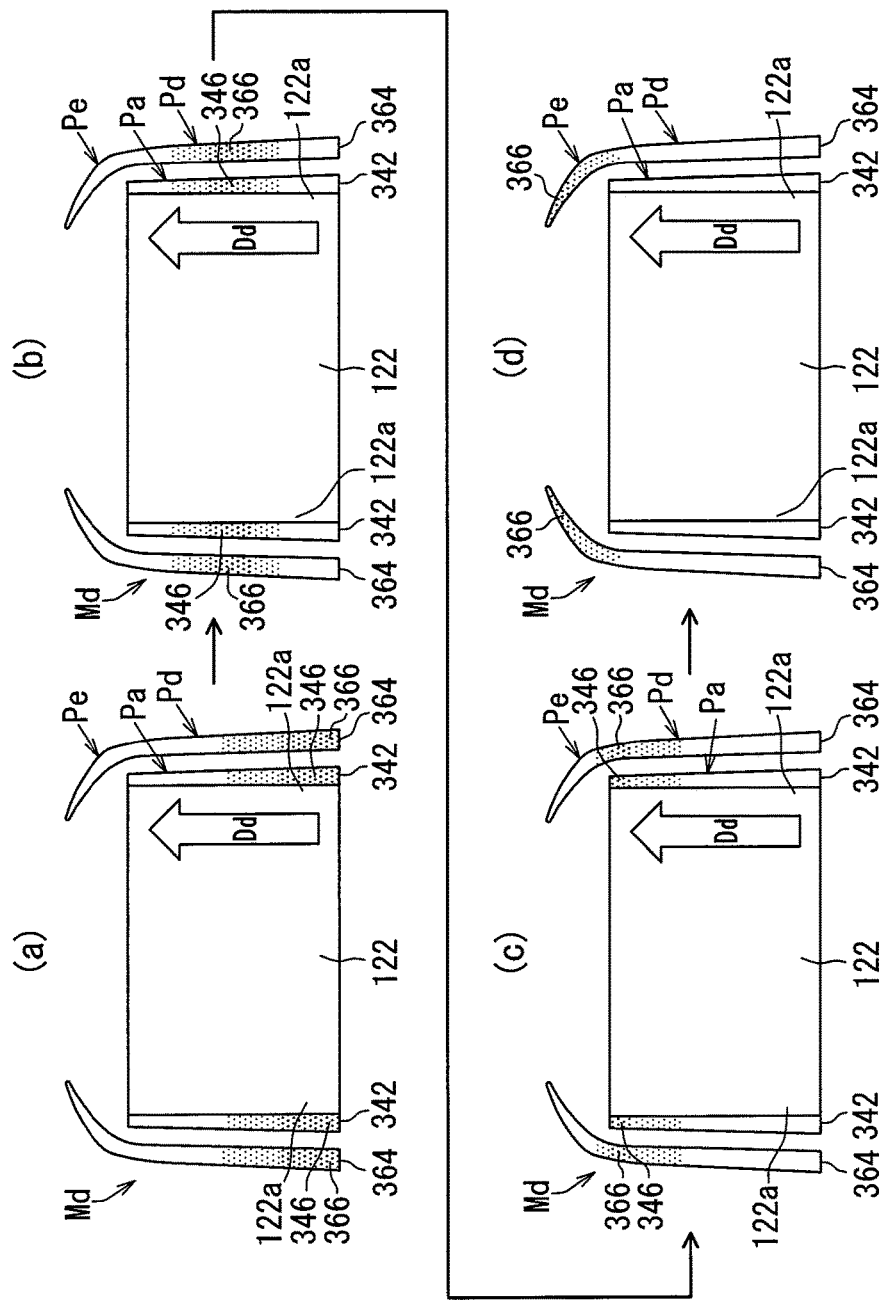
FIG. 6 is a schematic view illustrating a guiding operation mode of the light emission unit included in the display device for a vehicle according to the first embodiment.

In this case, the shift speed of the adjacent light emission areas 346 at the adjacent positions Pa and the shift speed of the separate light emission areas 366 at the separate positions Pd are determined such that the light emission positions of the respective light emission areas 346 and 366 in the up-down direction are located substantially equivalent positions as illustrated in the divisional figures (a), (b), and (c) of FIG. 6. However, the shift speed of the adjacent light emission areas 346 at the adjacent positions Pa and the shift speed of the separate light emission areas 366 at the separate positions Pd may be different from each other. In addition, during shift of the separate light emission areas 366 at the extension positions Pe, the adjacent light emission areas 346 are brought into the non-emission state at the adjacent positions Pa as illustrated in (d) of FIG. 6. However, during shift of the separate light emission areas 366 at the extension positions Pe, the adjacent light emission areas 346 may be maintained in the light emission state at the upper ends of the adjacent positions Pa, for example.

While the separate light emission areas 366 of the respective separate light emission windows 364 are maintained in the non-emission state in the maintaining operation mode Mh, the eyes of the user on the driver seat are attracted to the adjacent light emission areas 346 of the respective adjacent light guide bodies 342. On the other hand, in the guiding operation mode Md, both the adjacent light emission areas 346 of the respective adjacent light guide bodies 342 and the separate light emission areas 366 of the respective separate light emission windows 364 shift and change in the guiding direction Dd to draw and guide the eyes of the user in the guiding direction Dd. Particularly the separate light emission areas 366 of the respective separate light emission windows 364 change by shifting from the separate positions Pd to the extension positions Pe above the first display portion 122.

(Control Flow)

Figure 7:
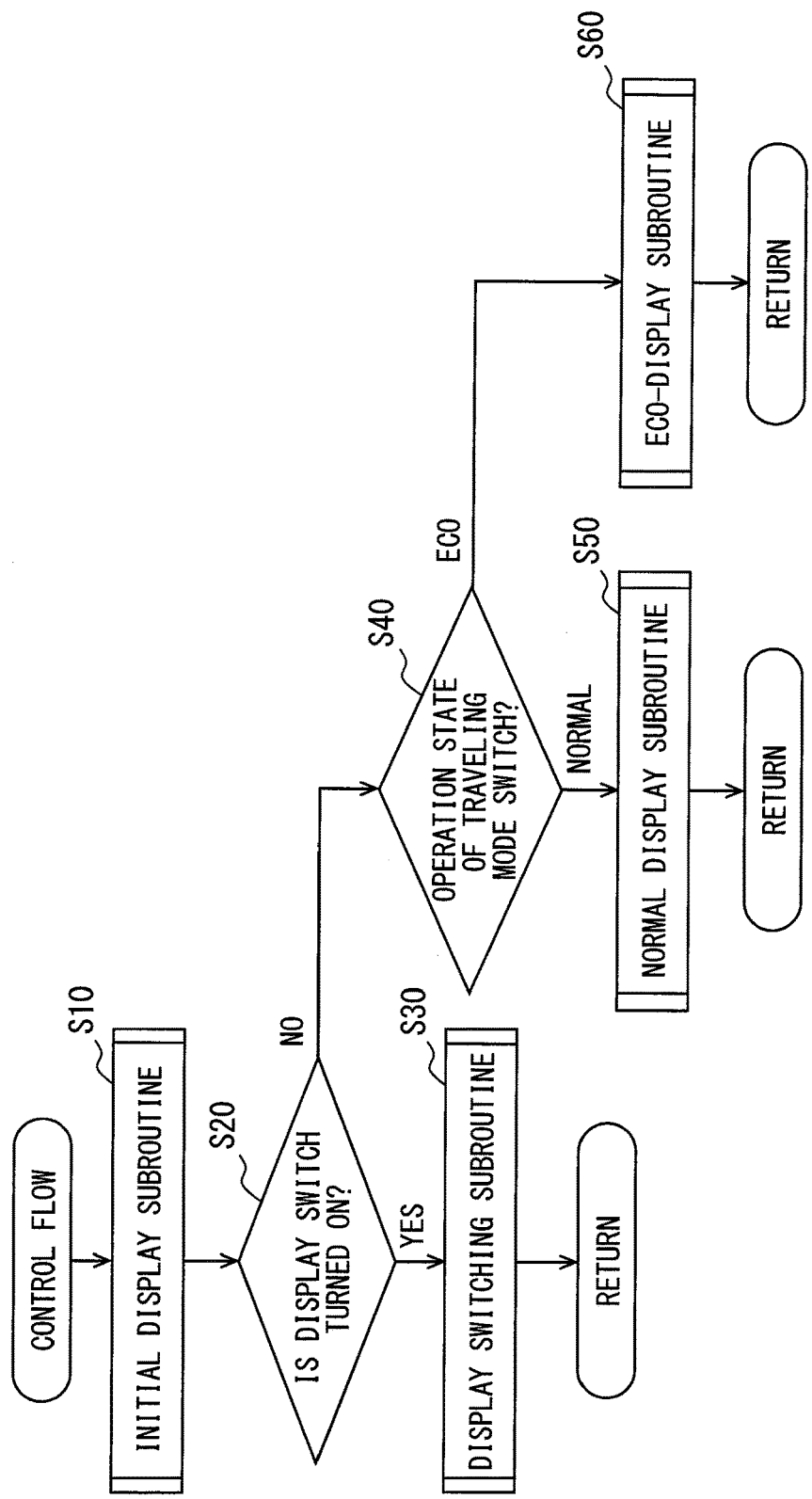
FIG. 7 is a flowchart showing a control flow executed by the display device for a vehicle according to the first embodiment.

Described hereinafter with reference to FIG. 7 are details of a control flow performed for controlling the units 10, 20, and 30 under the control program executed by the control unit 40. The control flow starts when the power switch is turned on, and ends when the power switch is turned off. A prefix "S" to a step number expresses a step. In each of FIGS. 10, 13, 16, and 19 referred to below, a white arrow indicating the guiding direction Dd is schematically overlapped on the first information 124 displayed in the first display portion 122. However, it is not intended that the white arrow is practically displayed on the first display portion 122.

Figure 8:
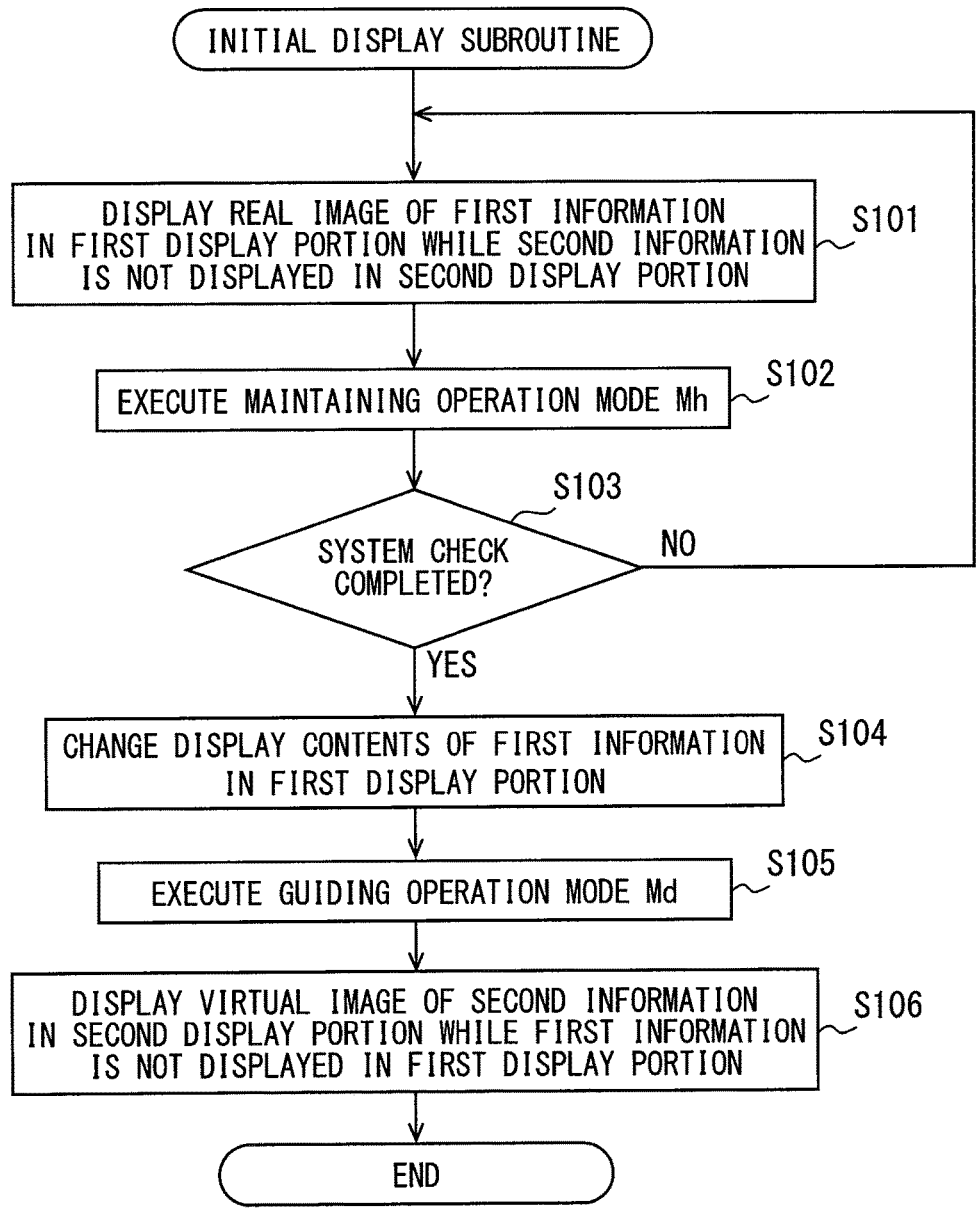
FIG. 8 is a flowchart showing an initial display subroutine in FIG. 7.
Figure 9:
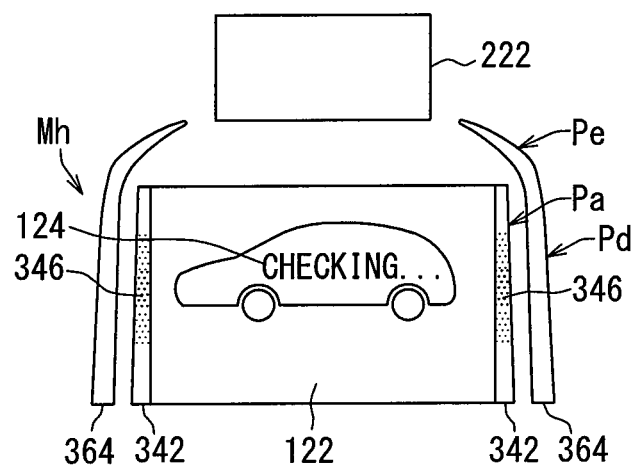
FIG. 9 is a schematic view illustrating a maintaining operation mode in the initial display subroutine in FIGS. 7 and 8 executed by the display device for a vehicle according to the first embodiment.

In S10 of the control flow shown in FIG. 7, an initial display subroutine shown in FIG. 8 is executed. In S101 in the initial display subroutine, a real image of the first information 124 is displayed in the first display portion 122 by controlling the display panel 12 and the backlight 14 as illustrated in FIG. 9. In this step, the first information 124 is configured by a character and a pattern indicating a status of system checking of the vehicle 2. On the other hand, the second information 224 is not displayed in the second display portion 222 in S101 by controlling the projector 24 as illustrated in FIG. 9.

In subsequent S102, the maintaining operation mode Mh is executed by controlling the adjacent light sources 340 and the separate light sources 360 as illustrated in FIG. 9. Accordingly, the adjacent light emission areas 346 of the adjacent light guide bodies 342 are maintained in the light emission state, while the separate light emission areas 366 of the separate light emission windows 364 are maintained in the non-emission state.

In subsequent S103, it is determined whether system checking has been completed based on an information signal from the integration ECU. If NO, the flow returns to S101. If YES, the flow shifts to S104.

Figure 10:
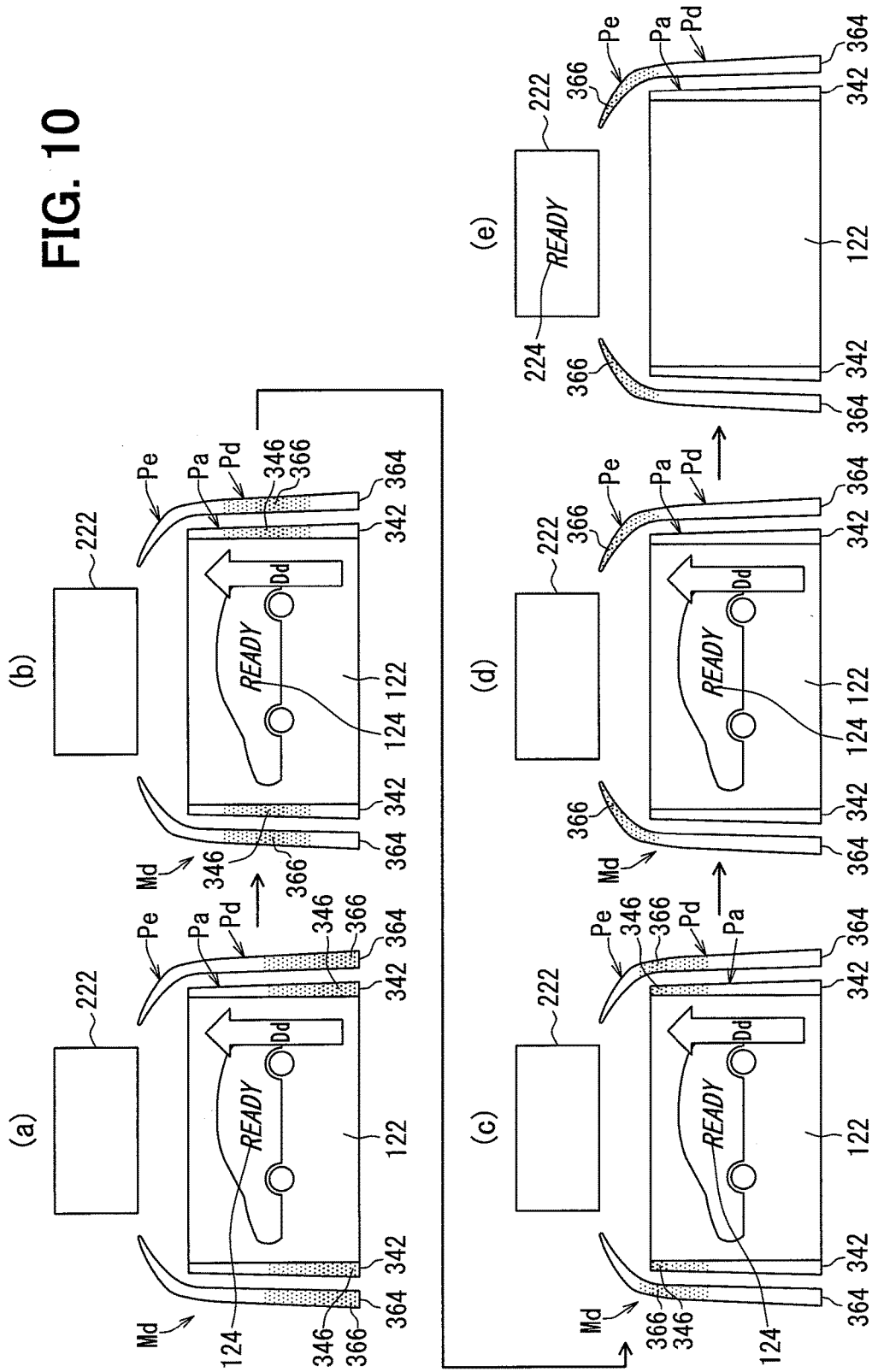
FIG. 10 is a schematic view illustrating a guiding operation mode in the initial display subroutine in FIGS. 7 and 8 executed by the display device for a vehicle according to the first embodiment.

In S104, display contents of the first information 124 displayed in the first display portion 122 are switched to contents as illustrated in divisional figures (a), (b), (c), and (d) of FIG. 10 by controlling the display panel 12 and the backlight 14. In this case, the character and pattern of the first information 124 are switched into a character and a pattern indicating completion of traveling preparations of the vehicle 2 after system checking. Note that the second information 224 in this step is maintained in the non-display state continuing from S101.

In subsequent S105, the guiding operation mode Md is executed as illustrated in the divisional figures (a), (b), (c), and (d) of FIG. 10 in this order by controlling the adjacent light sources 340 and the separate light sources 360. As a result, the adjacent light emission areas 346 of the adjacent light guide bodies 342 change in the guiding direction Dd, while the separate light emission areas 366 of the separate light emission windows 364 similarly change in the guiding direction Dd. The first information 124 in this step may be displayed by such an animation that a character indicating completion of traveling preparations of the vehicle 2 after system checking gradually shift in the guiding direction Dd in the first display portion 122.

In subsequent S106, the first information 124 is not displayed in the first display portion 122 by controlling the display panel 12 and the backlight 14 as illustrated in (e) of FIG. 10. Simultaneously, a virtual image of the second information 224 associated with the first information 124 not displayed is displayed in the second display portion 222 as illustrated in (e) of FIG. 10 by controlling the projector 24 in S106. In this case, the second information 224 is configured by a character indicating completion of traveling preparations of the vehicle 2 after system checking. The separate light emission areas 366 of the separate light emission windows 364 in this step are maintained in the light emission state at the front ends of the extension positions Pe. However, the separate light emission areas 366 of the separate light emission windows 364 may be brought into the non-emission state similarly to the adjacent light emission areas 346 of the adjacent light guide bodies 342.

In S104 to S106 described above, a change is produced in each of the light emission areas 346 and 366 at the time of linkage between the particular virtual image display of the second information 224 and the real image display of the first information 124 in view of system checking. The initial display subroutine in S10 ends by the processing described above.

According to the present embodiment described herein, steps S101 to S103 are repeated when it is determined in S103 that completion of system checking corresponding to a "linking condition" has not been met. On the other hand, steps S104 to S106 are executed when it is determined that the linking condition has been met. In other words, according to the present embodiment, a period from the start of initial S101 to YES in S103 is provided as a "maintaining period", while a period from YES in S103 to the end of S106 is provided as a "linking period".

After completion of S10 described above, the control flow shifts to S20 shown in FIG. 7. In S20, it is determined whether the display switch has been turned on by the user to start display switching based on an operation signal from the display switch. If YES, the flow shifts to S30. If NO, the flow shifts to S40.

Figure 11:
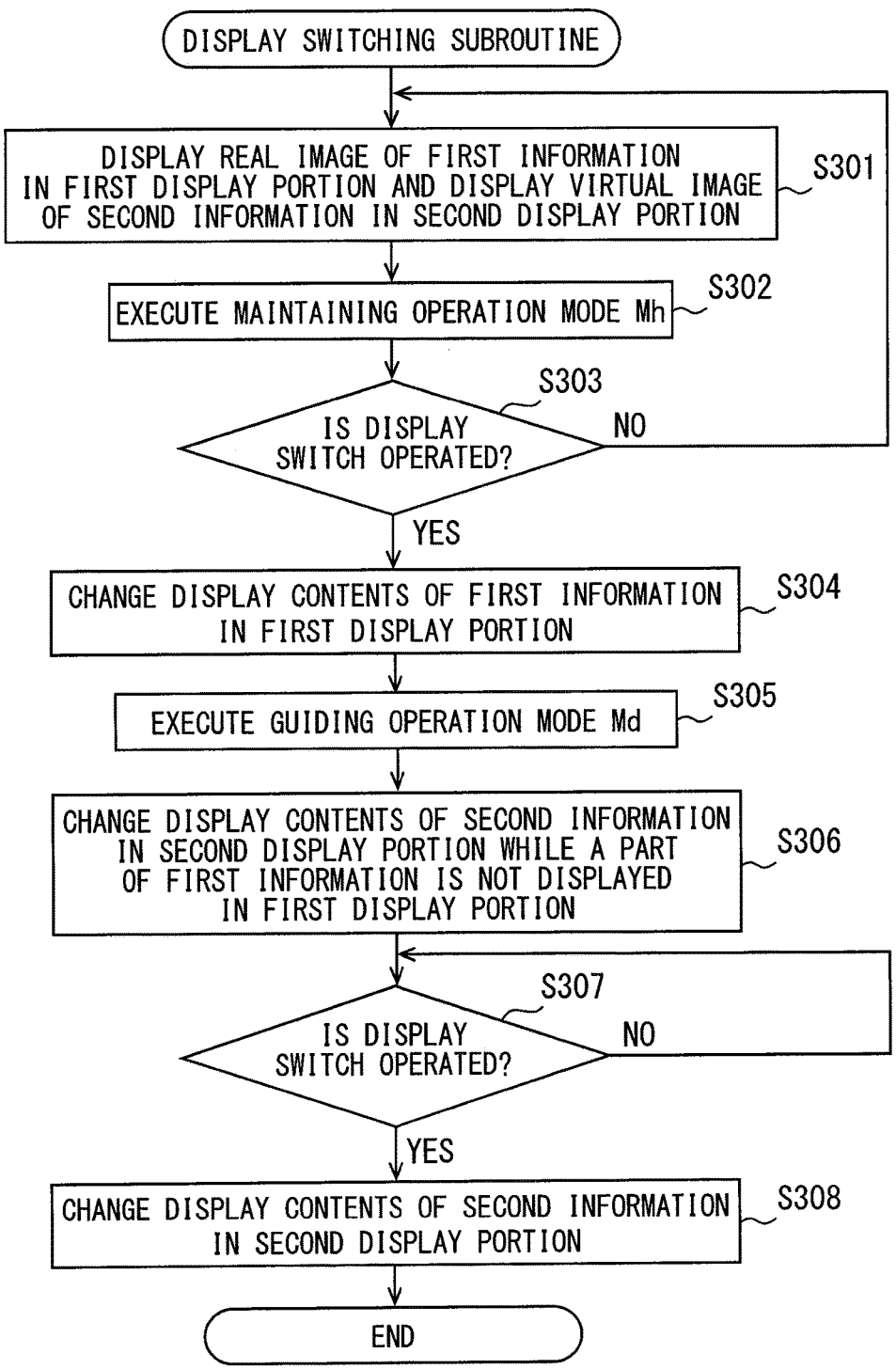
FIG. 11 is a flowchart showing a display switching subroutine in FIG. 7.
Figure 12:
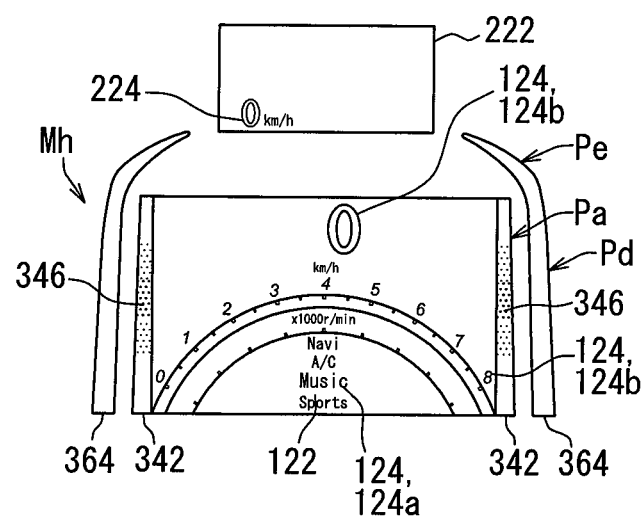
FIG. 12 is a schematic view illustrating a maintaining operation mode in the display switching subroutine in FIGS. 7 and 11 executed by the display device for a vehicle according to the first embodiment.

Hereinafter initially described is S30 executed when YES in S20. In S30, a display switching subroutine shown in FIG. 11 is executed. In S301 of the display switching subroutine, a real image of the first information 124 is displayed in the first display portion 122 as illustrated in FIG. 12 by controlling the display panel 12 and the backlight 14. In this case, a part 124a of the first information 124 is configured by characters and patterns indicating a plurality of items of a main menu for notification about display states selectable from the main menu in accordance with an operation of the display switch. On the other hand, a different part 124b of the first information 124 is configured by numerals and characters respectively indicating a traveling speed and a speed unit of the vehicle 2, and numerals and characters respectively indicating an engine speed and a speed unit of the driving source of the vehicle 2. In addition, virtual image of the second information 224 is also displayed in the second display portion 222 as illustrated in FIG. 12 by controlling the projector 24 in S301. In this case, the second information 224 is configured by a numeral and a character respectively indicating the traveling speed and the speed unit of the vehicle 2.

In subsequent S302, the maintaining operation mode Mh is executed as illustrated in FIG. 12 by controlling the adjacent light sources 340 and the separate light sources 360. Accordingly, the adjacent light emission areas 346 of the adjacent light guide bodies 342 are maintained in the light emission state, while the separate light emission areas 366 of the separate light emission windows 364 are maintained in the non-emission state.

In subsequent S303, it is determined whether the user has operated the display switch to select a desired item from the main menu and switch the display state, based on an operation signal from the display switch. If NO, the flow returns to S301. If YES, the flow shifts to S304.

Figure 13:
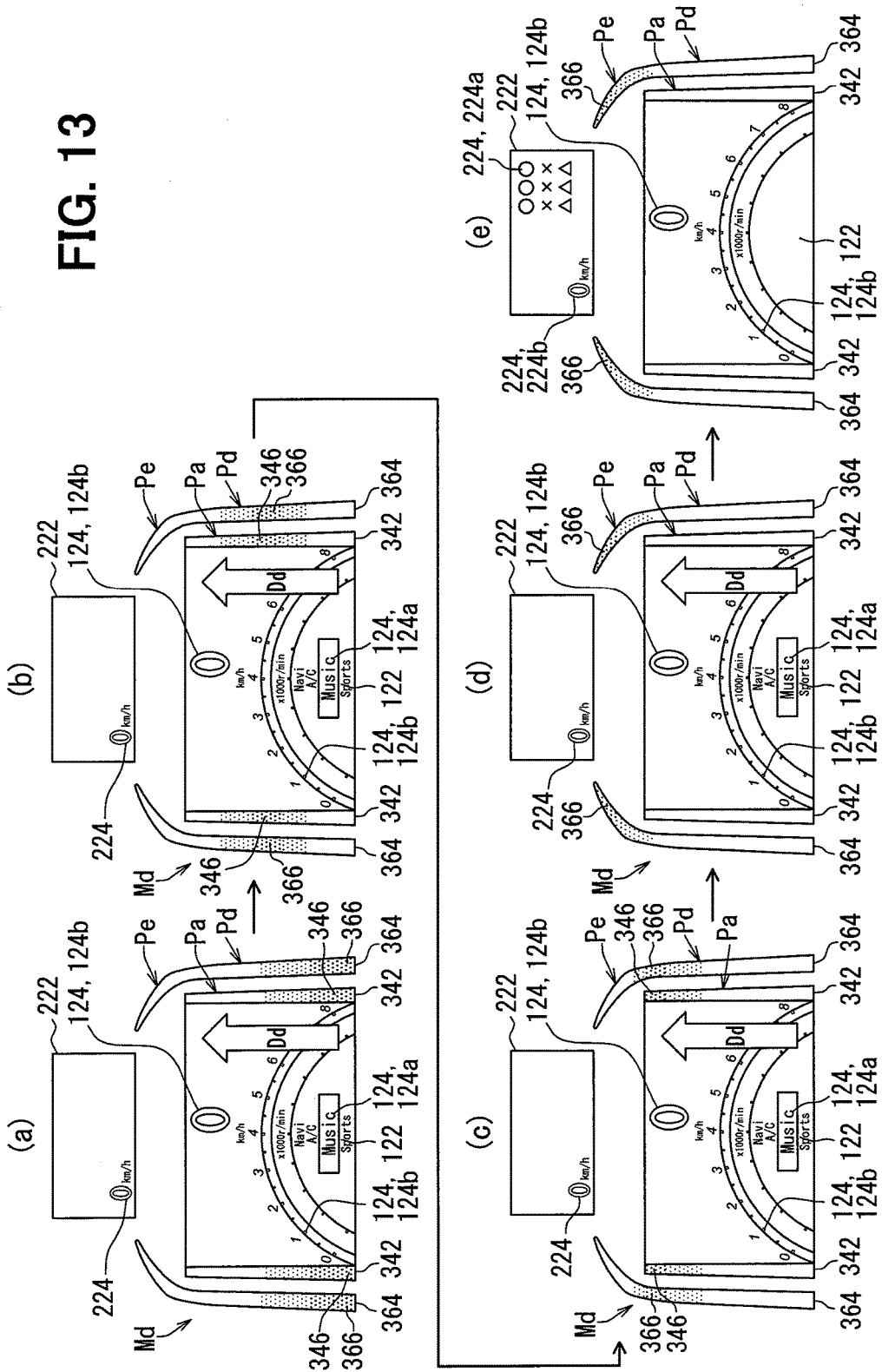
FIG. 13 is a schematic view illustrating a guiding operation mode in the display switching subroutine in FIGS. 7 and 11 executed by the display device for a vehicle according to the first embodiment.

In S304, display contents of the first information 124 in the first display portion 122 are switched to display contents illustrated in divisional figures (a), (b), (c), and (d) of FIG. 13 by controlling the display panel 12 and the backlight 14. In this case, the characters and patterns of the part 124*a* of the first information 124 are switched to characters and patterns indicating an item selected from the main menu in accordance with an operation of the display switch. On the other hand, the display contents in the different part 124*b* of the first information 124 in S301 continue in this step. Similarly, the display contents of the second information 224 in S301 continue in this step.

In subsequent S305, the guiding operation mode Md is executed as illustrated in the divisional figures (a), (b), (c), and (d) of FIG. 13 in this order by controlling the adjacent light sources 340 and the separate light sources 360. As a result, the adjacent light emission areas 346 of the adjacent light guide bodies 342 change in the guiding direction Dd, while the separate light emission areas 366 of the separate light emission windows 364 similarly change in the guiding direction Dd.

In subsequent S306, the part 124*a* of the first information 124 is not displayed in the first display portion 122 by controlling the display panel 12 and the backlight 14 as illustrated in (e) of FIG. 13. Simultaneously, the display contents of the second information 224 in the second display portion 222 in S306 are switched to display contents associated with the part 124*a* of the first information 124 not displayed as illustrated in (e) of FIG. 13 by controlling the projector 24. In this case, a part 224*a* of the second information 224 is configured by characters and patterns indicating a plurality of items of a sub menu associated with the item selected from the main menu for notification about selectable items from the sub menu. On the other hand, the different part 224*b* of the second information 224 is configured by numerals and characters respectively indicating the traveling speed and the speed unit of the vehicle 2. On the other hand, the display contents in the different part 124*b* of the first information 124 in S301 continue in this step. In this step, the separate light emission areas 366 of the separate light emission windows 364 are maintained in the light emission state at the front ends of the extension positions Pe. However, the separate light emission areas 366 of the separate light emission windows 364 may be brought into the non-emission state similarly to the adjacent light emission areas 346 of the adjacent light guide bodies 342.

In subsequent S307, it is determined whether the user has operated the display switch to select the sub menu contents and switch the display state based on an operation signal from the display switch. While NO, S307 is repeatedly executed. If YES, the flow shifts to S308.

In S308, the display contents of the second information 224 in the second display portion 222 are switched. In this case, characters and patterns of the part 224*a* of the second information 224 are switched to characters and patterns (not shown) indicating the item selected from the sub menu in accordance with the operation of the display switch. On the other hand, the display contents in S306 continue in the different part 224*b* of the second information 224.

According to S304 to S308 described above, a change is produced in each of the light emission areas 346 and 366 at the time of linkage between the particular virtual image display of the second information 224 and the real image display of the first information 124 in view of display switching. After completion of the display switching subroutine in S30 in the manner described above, the control flow returns to S10 (see FIG. 7).

According to the present embodiment, the selection operation of the display switch in S303 is determined as a "linking condition". When the condition is not met, S301 to S303 are repeated. When the condition is met, S304 to S308 are executed. In other words, according to the present embodiment, the period from the start of initial S301 to YES in S303 is provided as a "maintaining period", and a period from YES in S303 to the end of S308 is provided as a "linking period".

Hereinafter described is a shift to S40 based on NO in S20 as shown in FIG. 7, instead of the shift to S30. In S40, it is determined whether a selected operation state of the traveling mode switch is a normal mode or an eco-mode based on an operation signal from the traveling mode switch. When it is determined that the operation state is the normal mode selection state, i.e., normal determination, the flow shifts to S50. On the other hand, when it is determined that the operation state is the eco-mode selection state, the flow shifts to S60.

Figure 14:
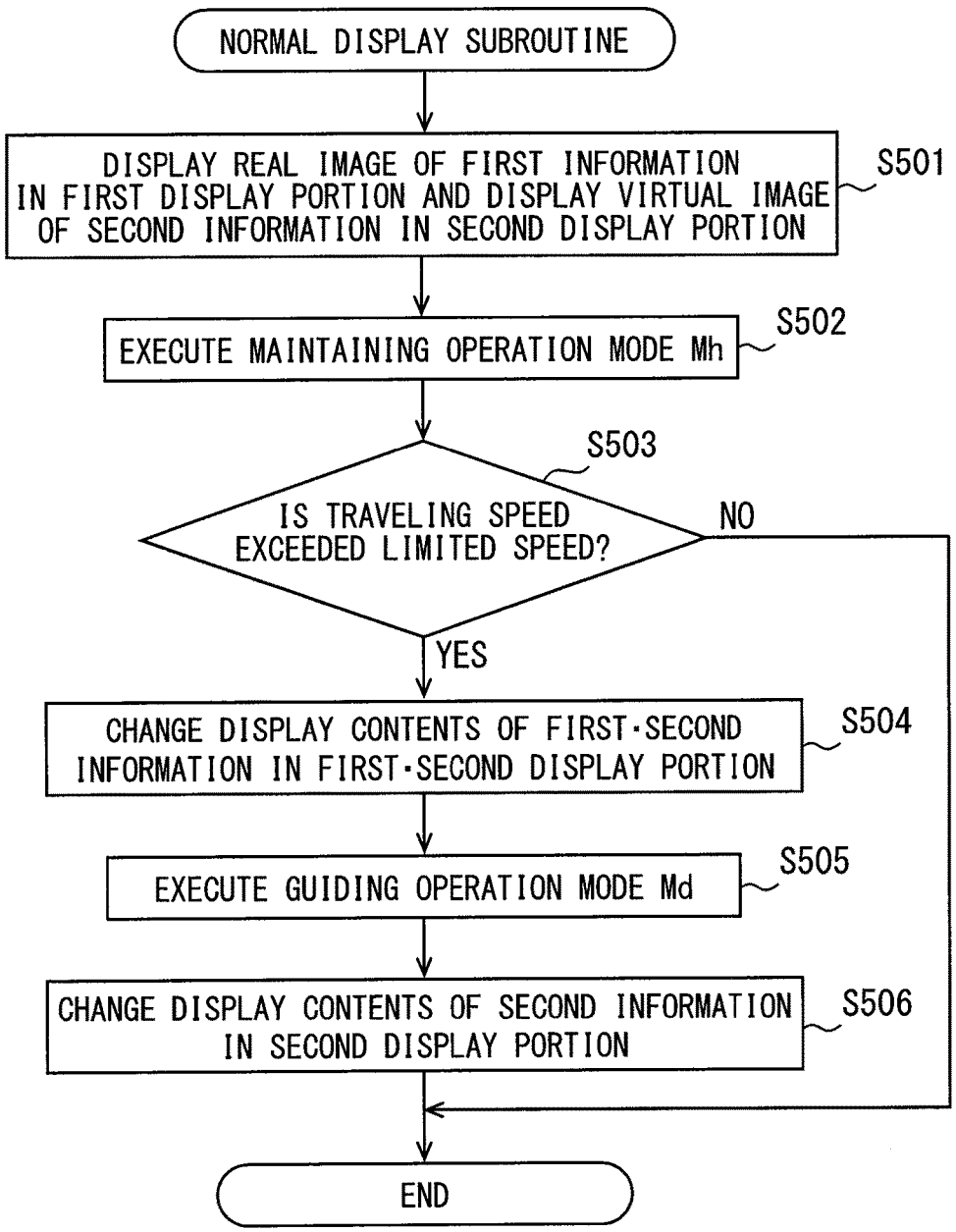
FIG. 14 is a flowchart showing a normal display subroutine in FIG. 7.
Figure 15:
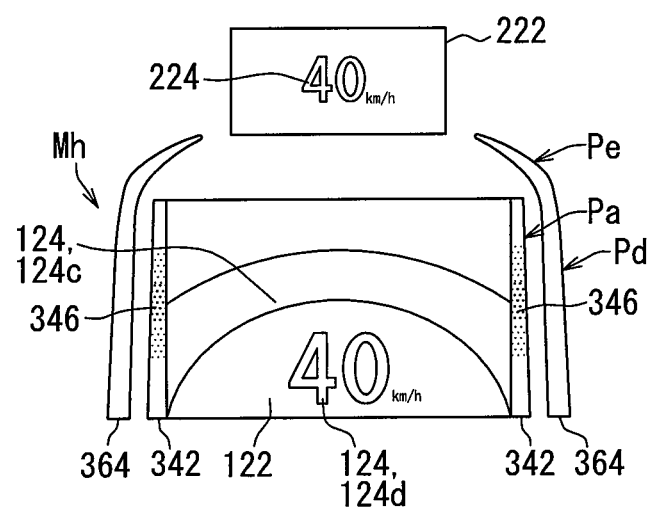
FIG. 15 is a schematic view illustrating a maintaining operation mode in the normal display subroutine in FIGS. 7 and 14 executed by the display device for a vehicle according to the first embodiment.

Hereinafter initially described is a shift to S50 from S40 based on the normal determination. In S50, a normal display subroutine is executed as shown in FIG. 14. In S501 of the normal display subroutine, a real image of the first information 124 is displayed in the first display portion 122 as illustrated in FIG. 15 by controlling the display panel 12 and the backlight 14. In this step, a part 124*d* of the first information 124 is configured by a numeral and a character respectively indicating the traveling speed and the speed unit of the vehicle 2. On the other hand, a different part 124*c* of the first information 124 is configured by a pattern indicating the normal mode. In addition, a virtual image of the second information 224 is displayed in the second display portion 222 in S501 as illustrated in FIG. 15 by controlling the projector 24. In this case, the second information 224 is configured by a numeral and a character respectively indicating the traveling speed and the speed unit of the vehicle 2.

In subsequent S502, the maintaining operation mode Mh is executed as illustrated in FIG. 15 by controlling the adjacent light sources 340 and the separate light sources 360. Accordingly, the adjacent light emission areas 346 of the adjacent light guide bodies 342 are maintained in the light emission state, while the separate light emission areas 366 of the separate light emission windows 364 are maintained in the non-emission state.

In subsequent S503, it is determined whether the traveling speed of the vehicle 2 has exceeded a speed limit of a traveling road, based on information signals from the vehicle speed sensor and the navigation unit. If NO, the normal display subroutine ends. In this case, the control flow returns to S10 (see FIG. 7). If YES, the flow shifts to S504.

Figure 16:
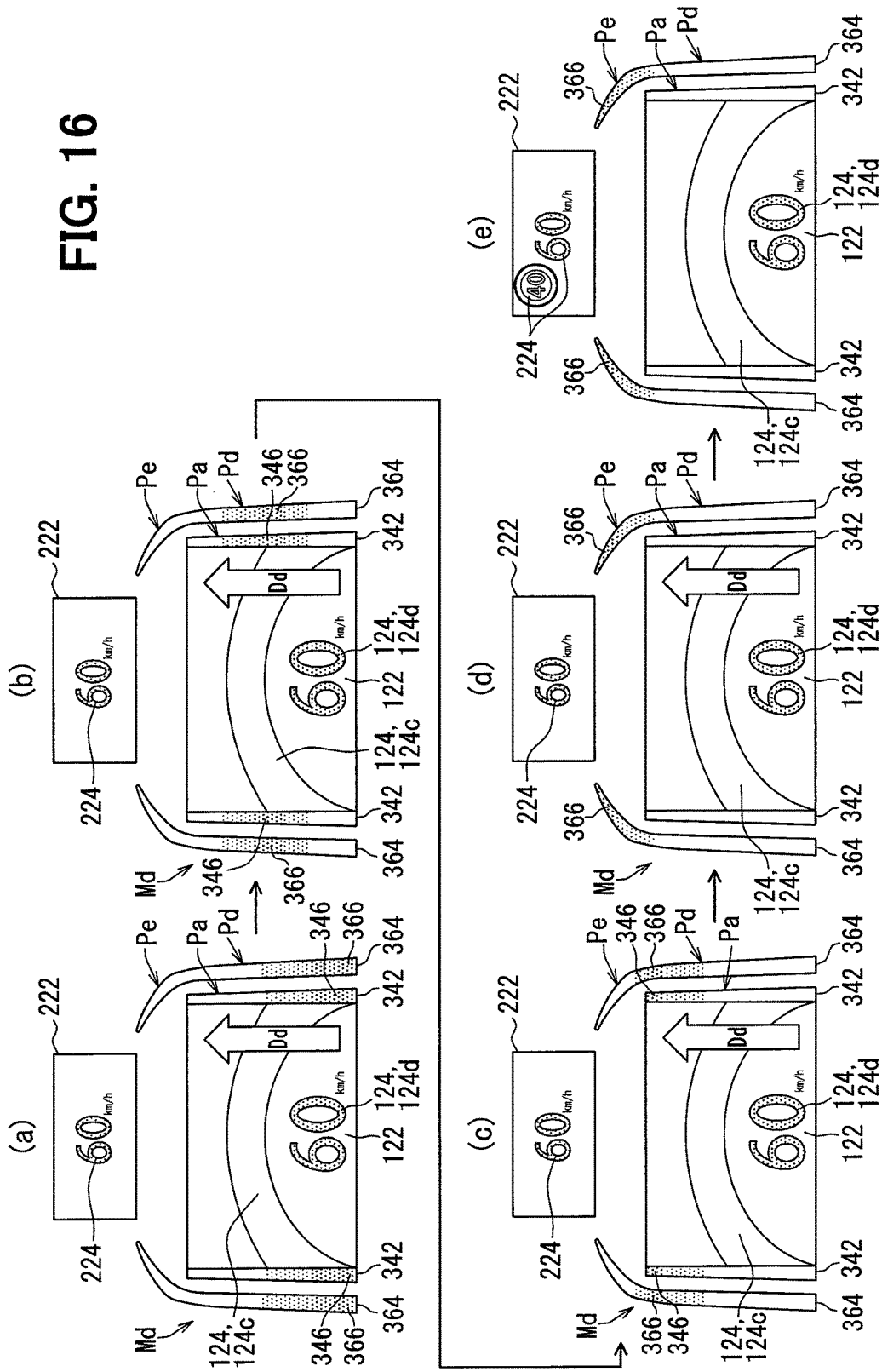
FIG. 16 is a schematic view illustrating a guiding operation mode in the normal display subroutine in FIGS. 7 and 14 executed by the display device for a vehicle according to the first embodiment.

In S504, display contents of the first information 124 and the second information 224 are respectively switched in the first display portion 122 and the second display portion 222 as illustrated in divisional figures (a), (b), (c), and (d) of FIG. 16 by controlling the display panel 12 and the backlight 14. In this case, display colors of the part 124d of the first information 124 and the second information 224 are switched from white to orange or like colors for notification that the traveling speed has exceeded the speed limit. Note that display contents of the first information 124 in the different part 124c in S501 continue in this step.

In subsequent S505, the guiding operation mode Md is executed as illustrated in the divisional figures (a), (b), (c) and (d) of FIG. 16 by controlling the adjacent light sources 340 and the separate light sources 360. As a result, the adjacent light emission areas 346 of the adjacent light guide bodies 342 change in the guiding direction Dd, while the separate light emission areas 366 of the separate light emission windows 364 similarly change in the guiding direction Dd.

In subsequent S506, display contents of the second information 224 in the second display portion 222 are switched as illustrated in (e) of FIG. 16 by controlling the projector 24. In this step, the second information 224 is configured by a pattern indicating a speed sign of the speed limit, and a numeral and a character of a type identical to the numeral and the character in S501 for notification that the traveling speed has exceeded the speed limit. The display contents of the first information 124 in the part 124d in S504 continue in this step, and therefore the display contents of the second information 224 are contents associated with the part 124d of the first information 124. In addition, the display contents of the first information 124 in the different part 124c in S501 continue in this step. The separate light emission areas 366 of the separate light emission windows 364 are maintained in the light emission state at the front ends of the extension positions Pe. However, the separate light emission areas 366 of the separate light emission windows 364 may be brought into the non-emission state similarly to the adjacent light emission areas 346 of the adjacent light guide bodies 342.

In S504 to S506 described above, a change is produced in each of the light emission areas 346 and 366 at the time of linkage between the particular virtual image display of the second information 224 and the real image display of the first information 124 in view of the traveling speed. After the normal display subroutine in S50 is completed in the manner described above, the control flow returns to S10 (see FIG. 7).

According to the present embodiment, an excess of the speed limit in S503 is determined as a "linking condition". When the condition is not met, S501 to S503 are repeated. When the condition is met, S504 to S506 are executed. According to the present embodiment, the period from the start of initial S501 to YES in S503 is provided as a "maintaining period", while the period from YES in S503 to the end of S506 is provided as a "linking period".

Figure 17:
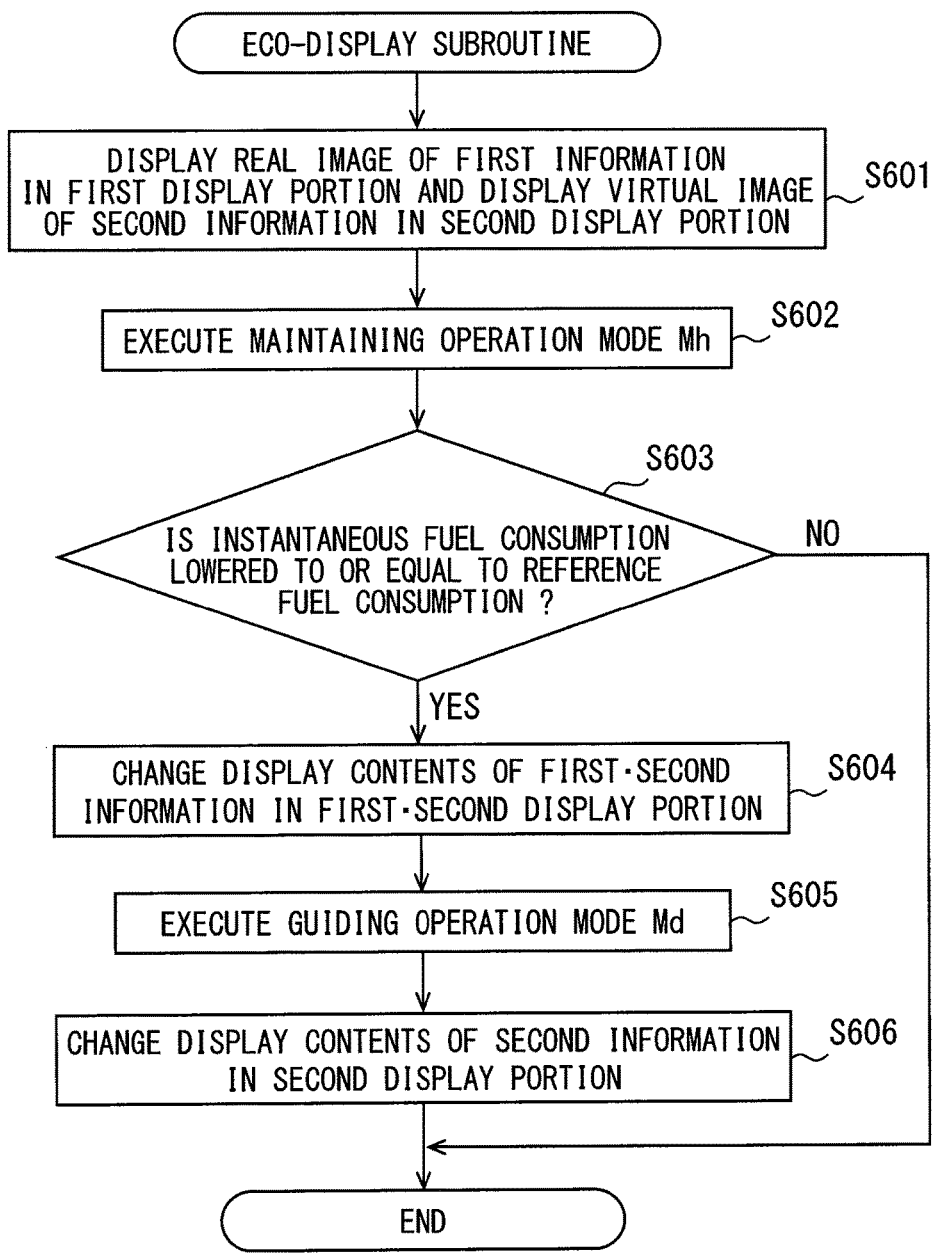
FIG. 17 is a flowchart showing an eco-display subroutine in FIG. 7.
Figure 18:
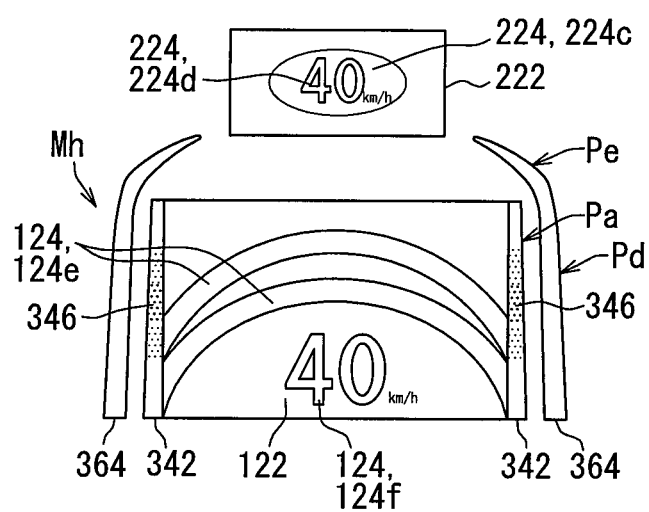
FIG. 18 is a schematic view illustrating a maintaining operation mode in the eco-display subroutine in FIGS. 7 and 17 executed by the display device for a vehicle according to the first embodiment.

Hereinafter described with reference to FIG. 7 is a shift to S60 based on eco-determination in S40, instead of the shift to S50. In S60, an eco-display subroutine shown in FIG. 17 is executed. In S601 of the eco-display subroutine, a real image of the first information 124 is displayed in the first display portion 122 as illustrated in FIG. 18 by controlling the display panel 12 and the backlight 14. In this case, a part 124e of the first information 124 is configured by a pattern indicating an eco-mode and an instantaneous fuel consumption of the vehicle 2. The part 124e of the first information 124 in this step may be displayed by an animation that gradually shifts in the guiding direction Dd in the first display portion 122. On the other hand, a different part 124f of the first information 124 is configured by a numeral and a character respectively indicating the traveling speed and the speed unit of the vehicle 2. Simultaneously, a virtual image of the second information 224 is displayed in the second display portion 222 as illustrated in FIG. 18 by controlling the projector 24 in S601. In this case, a part 224c of the second information 224 is configured by a pattern indicating an accumulated fuel consumption of instantaneous fuel consumptions. On the other hand, a different part 224d of the second information 224 is configured by a numeral and a character respectively indicating the traveling speed and the speed unit of the vehicle 2.

In subsequent S602, the maintaining operation mode Mh is executed by controlling the adjacent light sources 340 and the separate light sources 360 as illustrated in FIG. 18. Accordingly, the adjacent light emission areas 346 of the adjacent light guide bodies 342 are maintained in the light emission state, while the separate light emission areas 366 of the separate light emission windows 364 are maintained in the non-emission state.

In subsequent S603, it is determined whether the instantaneous fuel consumption of the vehicle 2 has lowered to a reference fuel consumption or smaller, based on an information signal from the integration ECU. The reference fuel consumption herein is set to a preferable upper limit for the instantaneous fuel consumption of the vehicle 2. If No in the determination with respect to the reference fuel consumption, the eco-display subroutine ends. In this case, the control flow returns to S10 (see FIG. 7). If YES, the flow shifts to S604.

Figure 19:
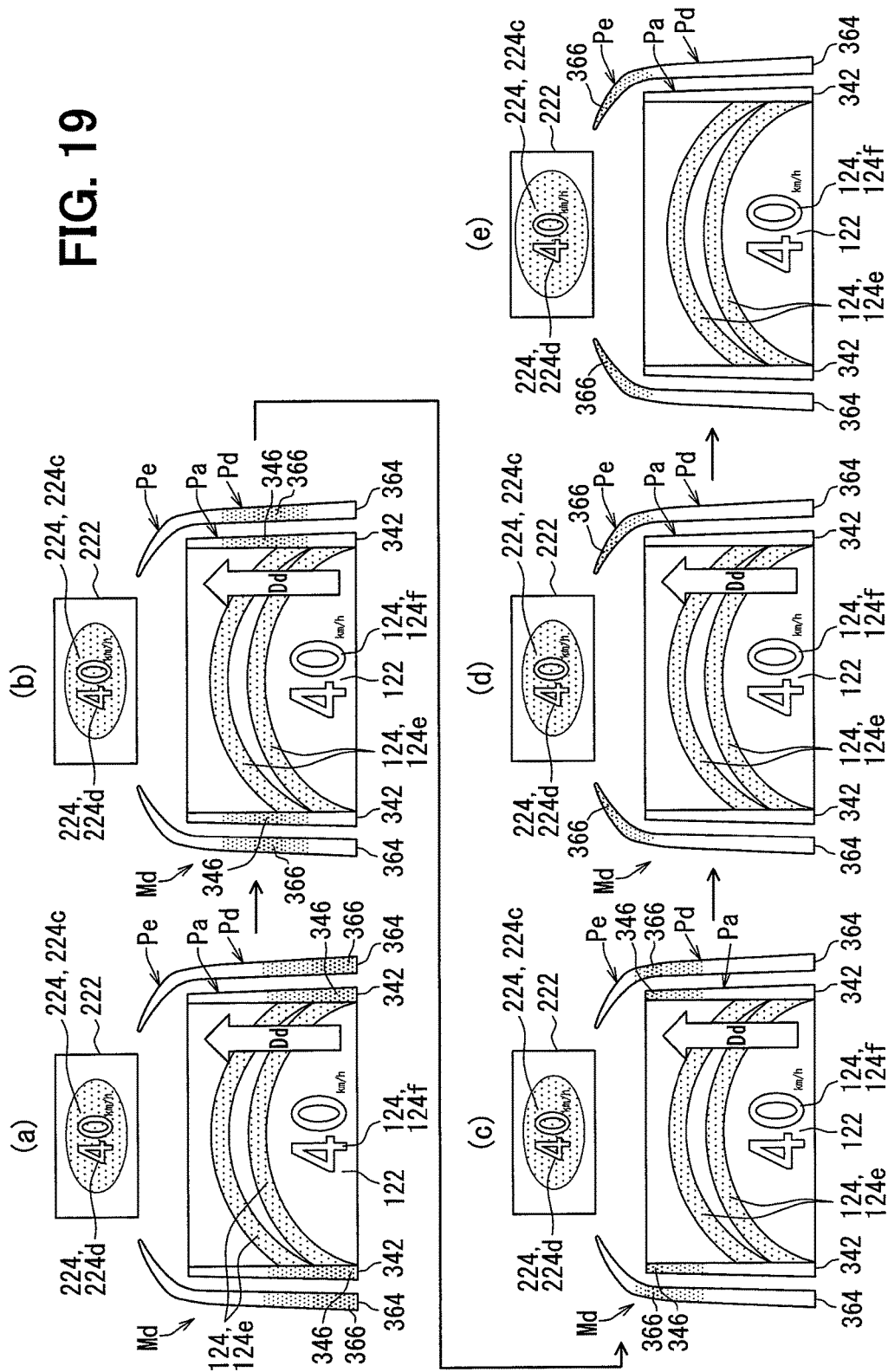
FIG. 19 is a schematic view illustrating a guiding operation mode in the eco-display subroutine in FIGS. 7 and 17 executed by the display device for a vehicle according to the first embodiment.

In S604, display contents of the first information 124 and the second information 224 are respectively switched in the first display portion 122 and the second display portion 222, as illustrated in divisional figures (a), (b), (c), and (d) of FIG. 19 by controlling the display panel 12 and the backlight 14. In this case, the display colors of the part 124e of the first information 124 and the part 224c of the second information 224 are switched from blue or the like to green or the like for notification that the instantaneous fuel consumption has lowered to the reference consumption or smaller. The notification may be displayed by such an animation that the part 124e of the first information 124 gradually shifts in the guiding direction Dd in the first display portion 122. In this step, the display contents of the first information 124 in the different part 124f in S601 continue. Similarly, the display contents of the second information 224 in the different part 224d in S601 continue.

In subsequent S605, the guiding operation mode Md is executed by controlling the adjacent light sources 340 and the separate light sources 360 in the order of (a), (b), (c), and (d) of FIG. 19. As a result, the adjacent light emission areas 346 of the adjacent light guide bodies 342 change in the guiding direction Dd, while the separate light emission areas 366 of the separate light emission windows 364 similarly change in the guiding direction Dd.

In subsequent step S606, display contents of the second information 224 in the second display portion 222 are switched as illustrated in (e) of FIG. 19 by controlling the projector 24. The part 224c of the second information 224 in this step is configured by a pattern indicating an accumulated fuel consumption of improved instantaneous fuel consumptions smaller than the reference fuel consumption. On the other hand, a different part 224d of the second information 224 is configured by a numeral and a character respectively indicating the traveling speed and the speed unit of the vehicle 2. In this step, the display contents of the first information 124 in the part 124e in S604 continue, and therefore display contents in the part 224c of the second information 224 are contents associated with the part 124e of the first information 124. On the other hand, the display contents of the first information 124 in the different part 124f in 601 continue. The separate light emission areas 366 of the separate light emission windows 364 are maintained in the light emission state at the front ends of the extension positions Pe. However, the separate light emission areas 366 of the separate light emission windows 364 may be brought into the non-emission state similarly to the adjacent light emission areas 346 of the adjacent light guide bodies 342.

In S604 to S606, a change is produced in each of the light emission areas 346 and 366 at the time of linkage between the particular virtual image display of the second information 224 and the real image display of the first information 124 in view of fuel consumption. After the eco-display subroutine in S60 is completed as described above, the control flow returns to S10 (see FIG. 7).

According to the present embodiment, fuel consumption improvement in S603 is determined as a "linking condition". When the condition is not met, S601 to S603 are repeated. When the condition is met, S604 to S606 are executed. In other words, according to the present embodiment, the period from the start of initial S601 to YES in S603 is provided as a "maintaining period", and a period from YES in S603 to the end of S606 is provided as a "linking period".

Advantageous effects offered by the first embodiment described above are hereinafter described.

According to the first embodiment, the particular virtual image display of the second information 224 is displayed in the second display portion 222 disposed above the first display portion 122 in linkage with the real image display of the first information 124 in the first display portion 122 during the "linking period". In this case, the light emission areas 346 and 366 of the light emission portions 34 and 36 disposed on the sides of the first display portion 122 change in the guiding direction Dd from the first display portion 122 toward the second display portion 222. The change attracts the eyes of the user inside the vehicle 2 toward the particular second information 224 requiring notification in association with the first information 124, thereby allowing the user to direct a gaze toward the particular second information 224. The linkage of display realizes matching between necessary information and gaze information, and improves effectiveness and secure notification of vehicle information.

In addition, the shift causing a change of each of the light emission areas 346 and 366 in the guiding direction Dd during the "linking period" in the first embodiment attracts the eyes of the user in accordance with the shift. In this case, the user intuitively directs a gaze toward the particular second information 224 requiring notification in association with the first information 124. Accordingly, the user is given a sense of reliability particularly in the effect of secure notification of vehicle information.

Moreover, according to the first embodiment, the "maintaining period" for maintaining the light emission state of the light emission areas 346 is provided to handle a situation that the "linking condition" for linking the particular virtual image display of the second information 224 with the real image display of the first information 124 is not met. In this case, the eyes of the user are easily directed toward the light emission areas 346. When the "linking condition" is met in the situation where the eyes of the user are directed toward the areas 346, the period switches to the "linking period" to change the light emission areas 346 and 366 in the guiding direction Dd. In this case, the user can notice the guidance guiding the eyes of the user. As a result, the user is capable of directing a gaze to the particular second information 224 requiring notification in association with the first information 124 at appropriate timing. Accordingly, the user is given a sense of reliability particularly in the effect of effectiveness of vehicle information.

Furthermore, in the "maintaining period" according to the first embodiment, the adjacent light emission areas 346 at the adjacent positions Pa disposed adjacent to and along the side edges 122a of the first display portion 122 are maintained in the light emission state. In addition, in the "maintaining period", the separate light emission areas 366, which are located at the separate positions Pd disposed away from the side edges 122a of the first display portion 122 through the adjacent light emission areas 346, are maintained in the non-emission state. In this case, the eyes of the user are easily directed toward the adjacent light emission areas 346 emphasized by the light emission state, rather than the separate light emission areas 366 in the non-emission state. In addition, in the "linking period" after the situation where the eyes of the user are directed in this manner, a change is produced in each of the adjacent light emission areas 346 and the separate light emission areas 366. As a result, the user easily notices the guidance guiding the eyes of the user. In this case, the user securely directs a gaze to the particular second information 224 requiring notification in association with the first information 124 at appropriate timing. Accordingly, effectiveness and secure notification of the vehicle information improve.

Moreover, in the "linking period" according to the first embodiment, the separate light emission areas 366 change to the positions above the first display portion 122 from the separate positions Pd disposed away from the side edges 122a of the first display portion 122 with the adjacent light emission areas 346 interposed between the separate positions Pd and the side edges 122a. In this case, the separate light emission areas 366 approach the second display portion 222 disposed above. As a result, the eyes of the user are guided to the closest possible position to the virtual image of the second information 224 displayed in the second display portion 222. Accordingly, the user is given a sense of reliability particularly in the effect of secure notification of vehicle information.

Second Embodiment

A second embodiment is a modified example of the first embodiment. The control unit 40 in the guiding operation mode Md of the second embodiment change light emission areas 2346 and 2366 by controlling the adjacent light sources 340 and the separate light sources 360 as illustrated in divisional figures of (a), (b), (c), (d), (e), (f), and (g) of FIG. 20.

More specifically, the size of the adjacent light emission area 2346 in each of the adjacent light guide bodies 342 gradually increases in the guiding direction Dd from the first display portion 122 toward the second display portion 222. In this case, particularly the size of the adjacent light emission area 2346 in each of the adjacent light guide bodies 342 temporarily increases in a range from a lower end in (a) of FIG. 20 to an upper end in (c) of FIG. 20 at the adjacent positions Pa. Furthermore, the size of the light emission area 2346 in each of the adjacent light guide bodies 342 decreases in a range from a lower end in (e) of FIG. 20 to an upper end of the adjacent position Pa in (f) of FIG. 20 of the adjacent position Pa in accordance with expansion of a non-emission area 2347 as an area other than the adjacent light emission area 2346.

On the other hand, each size of the separate light emission areas 2366 in the separate light emission windows 364 gradually increases, and then gradually decreases in the guiding direction Dd from the first display portion 122 toward the second display portion 222. In this case, particularly the size of the separate light emission area 2366 in each of the separate light emission windows 364 temporarily increases in a range from a lower end of the separate positions Pd in (a) of FIG. 20 to a front end of the extension position Pe in (d) of FIG. 20. Thereafter, the size of the light emission area 2366 in each of the separate light emission windows 364 decreases in a range from a lower end of the separate position Pd in (e) of FIG. 20 to an intermediate region in the front-rear and up-down directions in the extension positions Pe in (g) of FIG. 20 in accordance with expansion of a non-emission area 2367 as an area other than the separate light emission area 2366.

Figure 20:
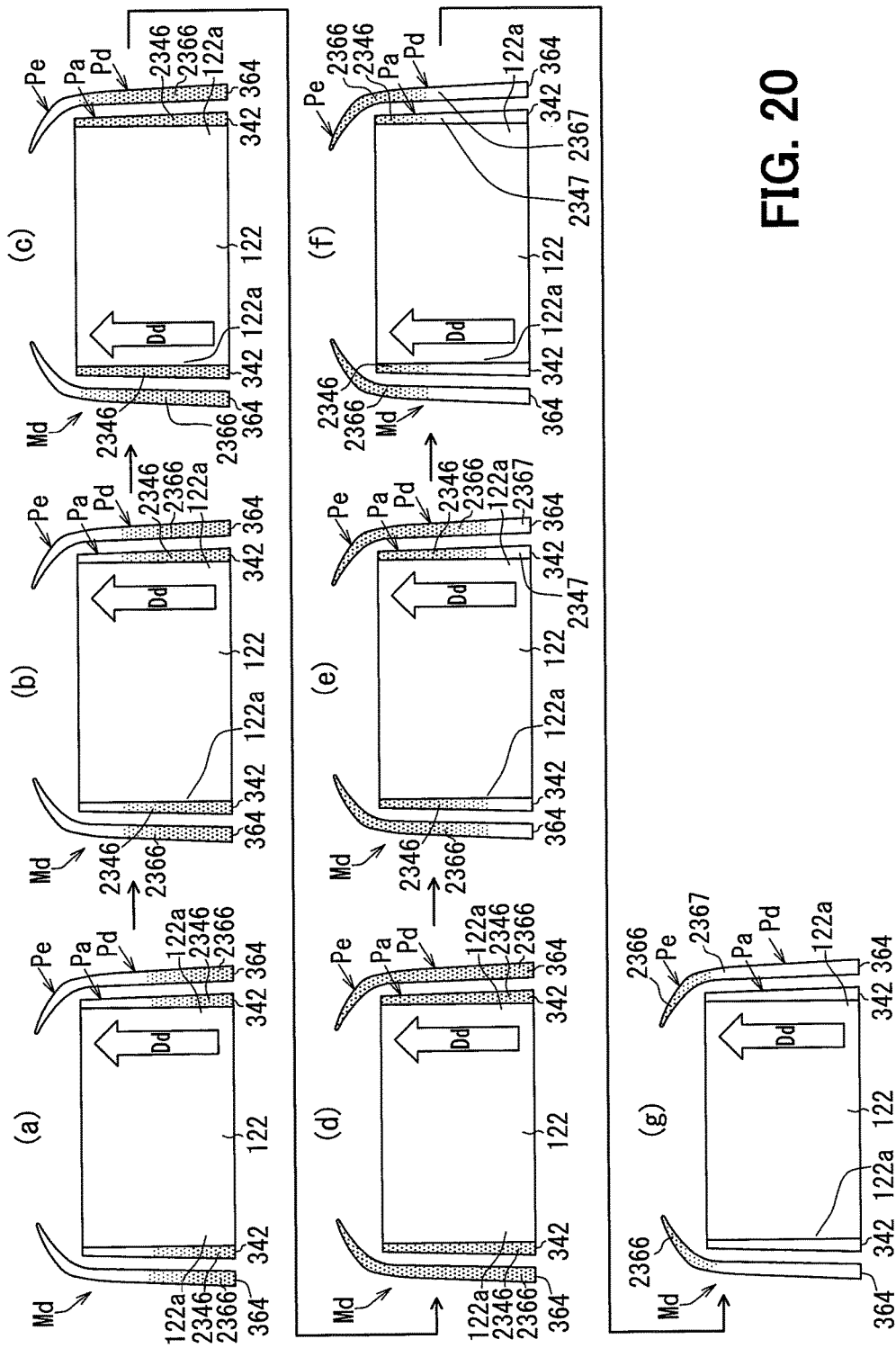
FIG. 20 is a schematic view illustrating a guiding operation mode of a light emission unit included in a display device for a vehicle according to a second embodiment.

In this case, the size change speed of the adjacent light emission areas 2346 in the adjacent positions Pa and the size change speed of the separate light emission areas 2366 in the separate positions Pd are determined such that the light emission positions of the adjacent light emission areas 2346 and the separate light emission areas 2366 are located substantially at equivalent positions in the up-down direction as illustrated in the divisional figures (a), (b), (c), (e), and (f) of FIG. 20. However, the size change speed of the adjacent light emission areas 2346 in the adjacent positions Pa and the size change speed of the separate light emission areas 2366 in the separate positions Pd may be different from each other.

At the time of size increase of the separate light emission areas 2366 at the extension positions Pe, the whole of the adjacent light emission areas 2346 in the adjacent positions Pa are maintained in the light emission state as illustrated in (d) of FIG. 20. However, the adjacent light emission areas 2346 may be brought into the non-emission state at the time of size increase of the separate light emission areas 2366 in the extension positions Pe. On the other hand, at the time of size decrease of the separate light emission areas 2366 in the extension positions Pe, the adjacent light emission areas 2346 in the adjacent positions Pa are brought into the non-emission state as illustrated in (g) of FIG. 20. However, the adjacent light emission areas 2346 may be brought into the light emission state at the upper ends of the adjacent positions Pa, for example, at the time of size decrease of the separate light emission areas 2366 in the extension positions Pe.

According to the second embodiment described herein, the guiding operation mode Md illustrated in FIG. 20 is executed in S105, S305, S505, and S605 of the control flow described in the first embodiment. Accordingly, in the "linking period" of the second embodiment, size increase causing a change in the guiding direction Dd is produced in each of the light emission areas 2346 and 2366, and therefore the eyes of the user are guided in accordance with the size increase. In this case, the user intuitively directs a gaze toward the particular second information 224 requiring notification in association with the first information 124. Accordingly, the user is given a sense of reliability particularly in the effect of secure notification of vehicle information.

Moreover, in the "linking period" of the second embodiment, size increase and subsequent size decrease causing a change in the guiding direction Dd is produced in each of the light emission areas 2346 and 2366, and therefore the eyes of the user are guided in accordance with the size increase and decrease. In this case, the user intuitively and securely directs a gaze to the particular second information 224 requiring notification in association with the first information 124. Accordingly, the user is given reliability particularly in the effect of secure notification of the vehicle information.

Other Embodiment

It should be appreciated that the present disclosure is not limited to the embodiments described above and can be implemented with various modification within the scope of the present disclosure.

More specifically, in a first modified example of the first and second embodiments, S105, S305, S505, and S605 of the control flow may be divided into a step for executing the guiding operation mode Md according to the first embodiment, and a step for executing the guiding operation mode Md according to the second embodiment. For example, a mode similar to the guiding operation mode Md according to the first embodiment may be executed in S505 and S605, while a mode similar to the guiding operation mode Md according to the second embodiment may be executed in S105 and S305.

Figure 21:
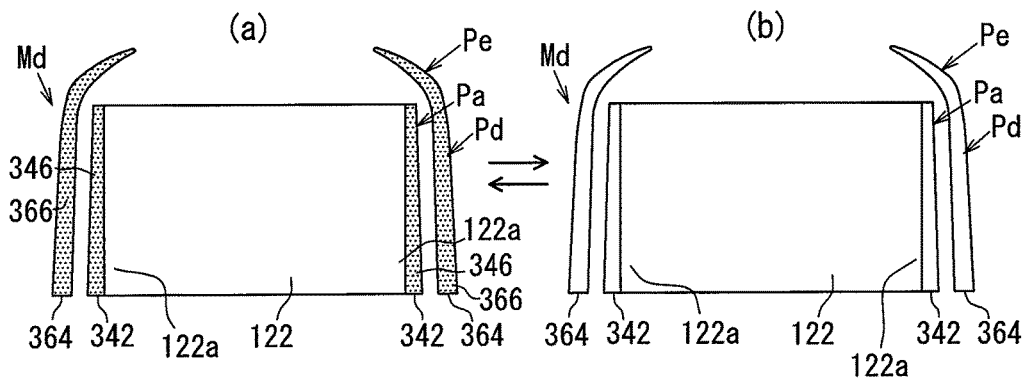
FIG. 21 is a schematic view illustrating a modified example of FIG. 6.

In a second modified example of the first and second embodiments, the guiding operation mode Md may be executed such that at least either the light emission areas 346 or 366, or either the light emission areas 2346 or 2366 blink in steps S105, S305, S505, S605 except for at least one of these steps. For example, the guiding operation mode Md in S505 may blink both the adjacent light emission areas 346 or 2346 and the separate light emission areas 366 or 2366 at fixed positions such that states illustrated in the divisional figures (a) and (b) of FIG. 21 (corresponding to the second modified example of the first embodiment) are alternately repeated.

In a third modified example of the first and second embodiments, the control flow may be modified to additionally include a step for executing the guiding operation mode Md similar to the guiding operation mode Md in S50 when the traveling speed of the vehicle 2 exceeds the speed limit in S60.

In a fourth modified example of the first and second embodiments, the control flow may be modified not to execute steps S10, S30, S50, and S60 except for at least one of these steps. When S30 is not executed, S20 need not be executed. When at least either S50 or S60 is not executed, S40 need not be executed.

In a fifth modified example of the first and second embodiments, the control flow may be modified to adopt a different "linking condition" as a trigger for setting the "linking period" other than the linking conditions in S103, S303, S503, and S603. For example, an operation for opening a door of the vehicle 2 from the outside, or an operation for turning off the power switch of the vehicle 2 may be adopted as the different "linking condition".

Figure 22:
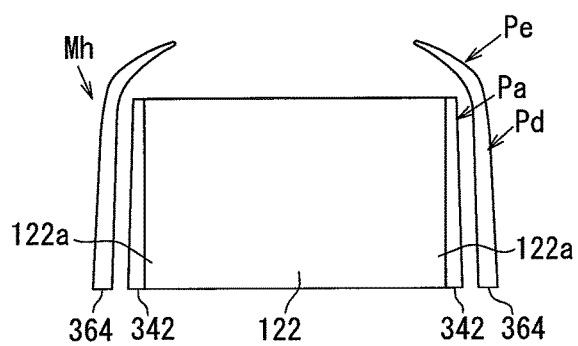
FIG. 22 is a schematic view illustrating a modified example of FIG. 5.

In a sixth modified example of the first and second embodiments, the maintaining operation mode Mh may be executed such that the adjacent light emission areas 346 or 2346 maintain the non-emission state similarly to the separate light emission areas 366 or 2366 in at least one of steps S102, S302, S502, and S602. For example, the maintaining operation mode Mh may be executed such that the adjacent light emission areas 346 or 2346 maintains the non-emission state as illustrated in FIG. 22 (corresponding to the sixth modified example of the first embodiment) in all steps of S102, S302, S502, and S602.

In a seventh modified example of the first and second embodiments, the guiding operation mode Md may be executed such that the separate light emission areas 366 or 2366 do not change to positions above the separate positions Pd by eliminating the separate light emission portions 36 from the extension positions Pe. Alternatively, in an eighth modified example of the first and second embodiments, the guiding operation mode Md may be executed such that the separate light emission areas 366 or 2366 change only positions above the separate positions Pd by eliminating the separate light emission portions 36 from the separate positions Pd.

In a ninth modified example of the first and second embodiments, the guiding operation mode Md may be executed such that only the adjacent light emission areas 346 or 2346 change by eliminating the separate light emission portions 36. Alternatively, in a tenth modified example of the first and second embodiments, the guiding operation mode Md may be executed such that only the separate light emission areas 366 or 2366 change on at least the sides of the first display portion 122 by eliminating the adjacent light emission portions 34.

In an eleventh modified example of the second embodiment, the guiding operation mode Md may be executed such that the sizes of the light emission areas 2346 and 2366 do not decrease in the guiding direction Dd after increase in the guiding direction Dd. Alternatively, in a twelfth modified example of the second embodiment, the guiding operation mode Md may be executed such that the sizes of the light emission areas 2346 and 2366 decrease in the guiding direction Dd from the maximum sizes.

Figure 23:
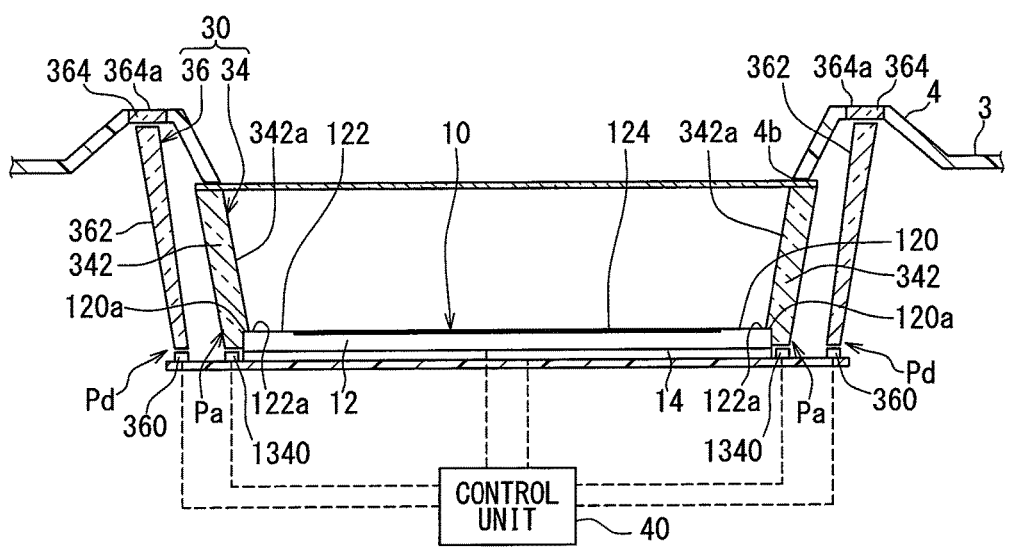
FIG. 23 is a schematic view illustrating a modified example of FIG. 4.

In a thirteenth modified example of the first and second embodiments, adjacent light sources 1340 each of which is configured by a plurality of LEDs as illustrated in FIG. 23 may be adopted instead of the adjacent light sources 340 each of which is configured by the side portions 120a of the screen 120. In this case, the positions of the adjacent light emission areas 346 or 2346 are determined in accordance with the positions of the turned-on adjacent light sources 1340.

What is claimed is:

1. A display device for a vehicle, the display device displaying vehicle information associated with the vehicle and comprising:
   a first display unit that displays a real image of first information in a first display portion inside the vehicle, the first information indicating the vehicle information;
   a second display unit that displays a virtual image of second information in a second display portion inside the vehicle by projecting an optical image to the second display portion, the second display portion being disposed above the first display portion and transmitting an external image, and the second information indicating the vehicle information;
   a light emission unit that forms a light emission area in a light emission portion inside the vehicle and adjacent to a side of the first display portion; and
   a control unit that controls the first display unit and the second display unit, and controls the light emission unit, the control unit changing the light emission area in a guiding direction from the first display portion toward the second display portion during a linking period for linking a particular virtual image display of the second information with a real image display of the first information, wherein
   the control unit sets a maintaining period for maintaining a light emission state of the light emission area when a linking condition for linking the particular virtual image display of the second information with the real image display of the first information is not met, and
   the control unit sets the linking period when the linking condition is met.

2. The display device according to claim 1, wherein:
   the light emission portion includes an adjacent light emission area that is the light emission area and lies at an adjacent position disposed adjacent to a side edge of the first display portion and extending along the side edge, and includes a separate light emission area that is the light emission area and lies at a separate position disposed away from the side edge of the first display portion through the adjacent light emission area;
   the control unit maintains the adjacent light emission area in a light emission state, and maintains the separate light emission area in a non-emission state during the maintaining period; and
   the control unit changes both the adjacent light emission area and the separate light emission area in the guiding direction during the linking period.

3. The display device according to claim 1, wherein:
   the light emission portion includes an adjacent light emission area that is the light emission area and lies at an adjacent position disposed adjacent to a side edge of the first display portion and extending along the side edge, and includes a separate light emission area that is the light emission area and lies at a separate position disposed away from the side edge of the first display portion through the adjacent light emission area; and
   the control unit changes both the adjacent light emission area and the separate light emission area in the guiding direction during the linking period.

4. The display device according to claim 3, wherein the control unit changes the separate light emission area from the separate position to a position above the first display portion during the linking period.

5. The display device according to claim 1, wherein the control unit shifts the light emission area in the guiding direction during the linking period.

6. The display device according to claim 1, wherein the control unit increases a size of the light emission area in the guiding direction during the linking period.

7. The display device according to claim 6, wherein the control unit increases the size of the light emission area in the guiding direction, and then decreases the size of the light emission area in the guiding direction during the linking period.

8. A display device for a vehicle, the display device displaying vehicle information associated with the vehicle and comprising:
   a first display unit that displays a real image of first information in a first display portion inside the vehicle, the first information indicating the vehicle information;
   a second display unit that displays a virtual image of second information in a second display portion inside the vehicle by projecting an optical image to the second display portion, the second display portion being disposed above the first display portion and transmitting an external image, and the second information indicating the vehicle information;

a light emission unit that forms a light emission area in a light emission portion inside the vehicle and adjacent to a side of the first display portion; and a processor that controls the first display unit and the second display unit, and controls the light emission unit, the processor changing the light emission area in a guiding direction from the first display portion toward the second display portion during a linking period for linking a particular virtual image display of the second information with a real image display of the first information, wherein the processor sets a maintaining period for maintaining a light emission state of the light emission area when a linking condition for linking the particular virtual image display of the second information with the real image display of the first information is not met, and the processor sets the linking period when the linking condition is met.

9. The display device according to claim 8, wherein:

the light emission portion includes an adjacent light emission area that is the light emission area and lies at an adjacent position disposed adjacent to a side edge of the first display portion and extending along the side edge, and includes a separate light emission area that is the light emission area and lies at a separate position disposed away from the side edge of the first display portion through the adjacent light emission area;

the processor maintains the adjacent light emission area in a light emission state, and maintains the separate light emission area in a non-emission state during the maintaining period; and the processor changes both the adjacent light emission area and the separate light emission area in the guiding direction during the linking period.

10. The display device according to claim 8, wherein:

the light emission portion includes an adjacent light emission area that is the light emission area and lies at an adjacent position disposed adjacent to a side edge of the first display portion and extending along the side edge, and includes a separate light, emission area that is the light emission area and lies at a separate position disposed away from the side edge of the first display portion through the adjacent light emission area; and the processor changes both the adjacent light emission area and the separate light emission area in the guiding direction during the linking period.

11. The display device according to claim 10, wherein the processor changes the separate light emission area from the separate position to a position above the first display portion during the linking period.

12. The display device according to claim 8, wherein the processor shifts the light emission area in the guiding direction during the linking period.

13. The display device according to claim 8, wherein the processor increases a size of the light emission area in the guiding direction during the linking period.

14. The display device according to claim 13, wherein the processor increases the size of the light emission area in the guiding direction, and then decreases the size of the light emission area in the guiding direction during the linking period.

* * * * *